A. G. AND A. RONNING.
COMBINATION TRACTOR IMPLEMENT.
APPLICATION FILED MAR. 6, 1916.

1,340,461.

Patented May 18, 1920.
15 SHEETS—SHEET 1.

Inventors:
ANDREAN G. RONNING.
ADOLPH RONNING.
By Whiteley and Ruckman
THEIR ATTORNEYS.

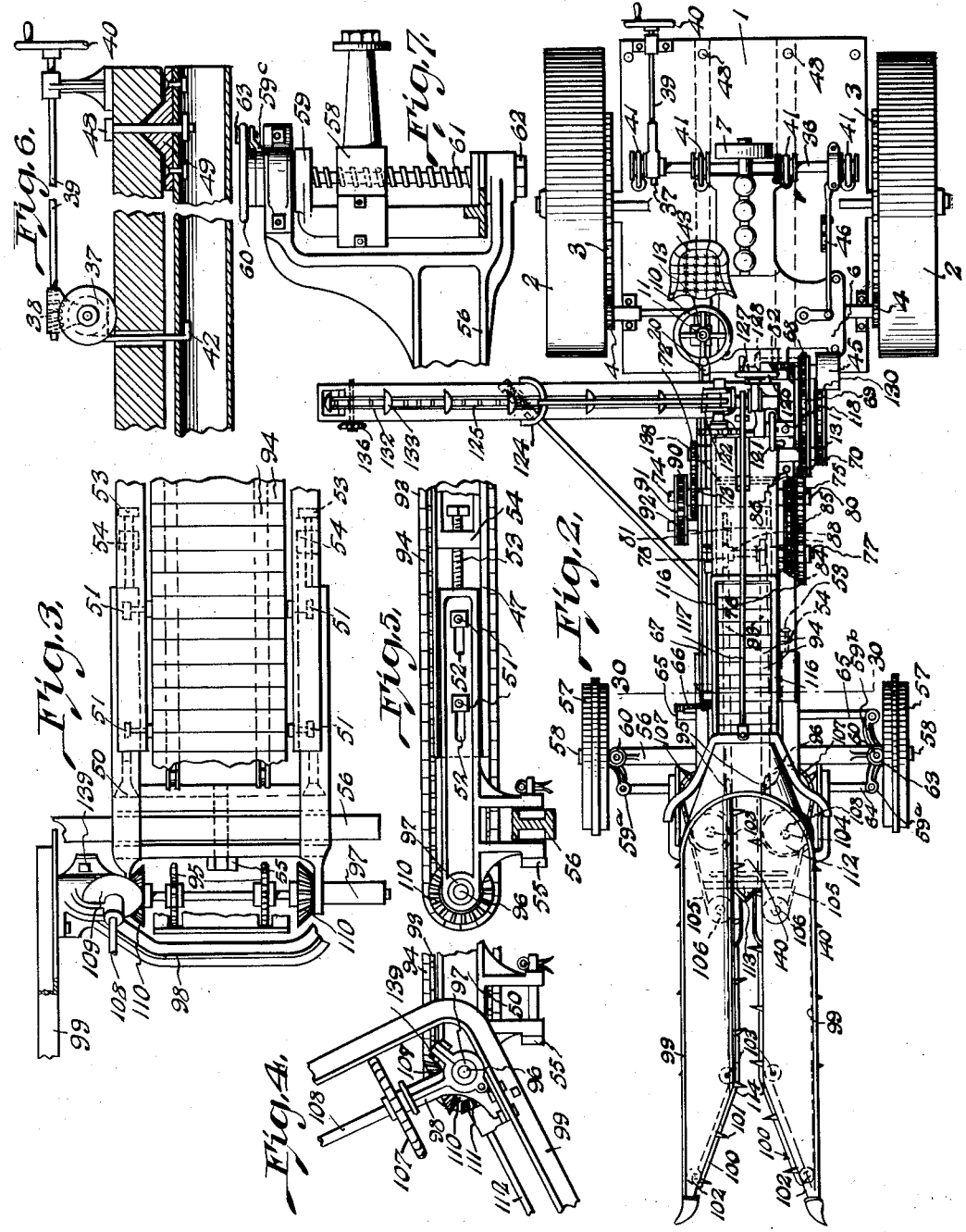

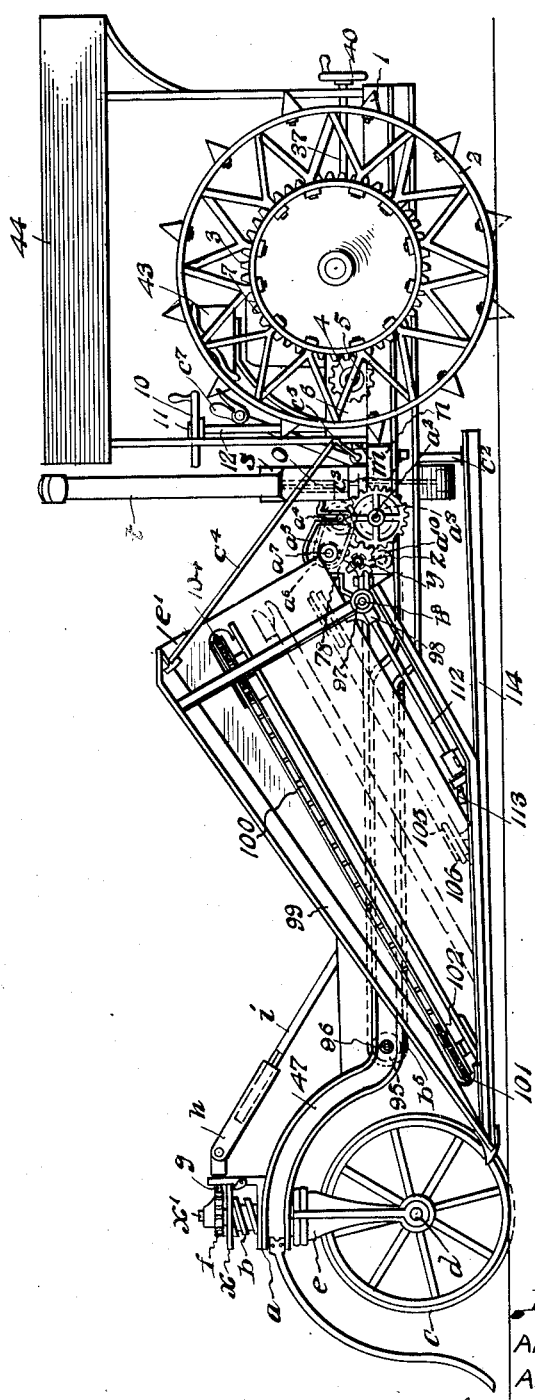

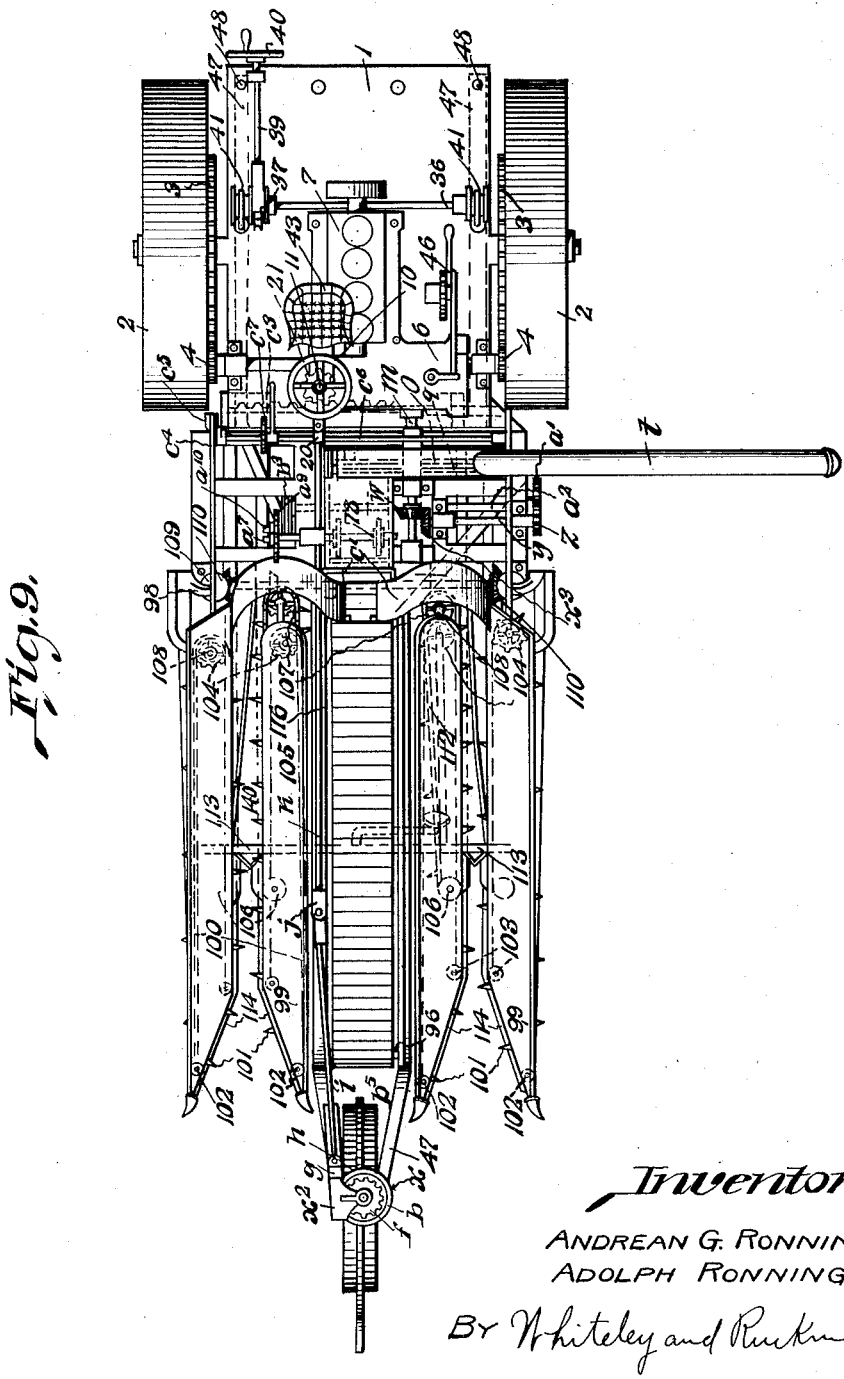

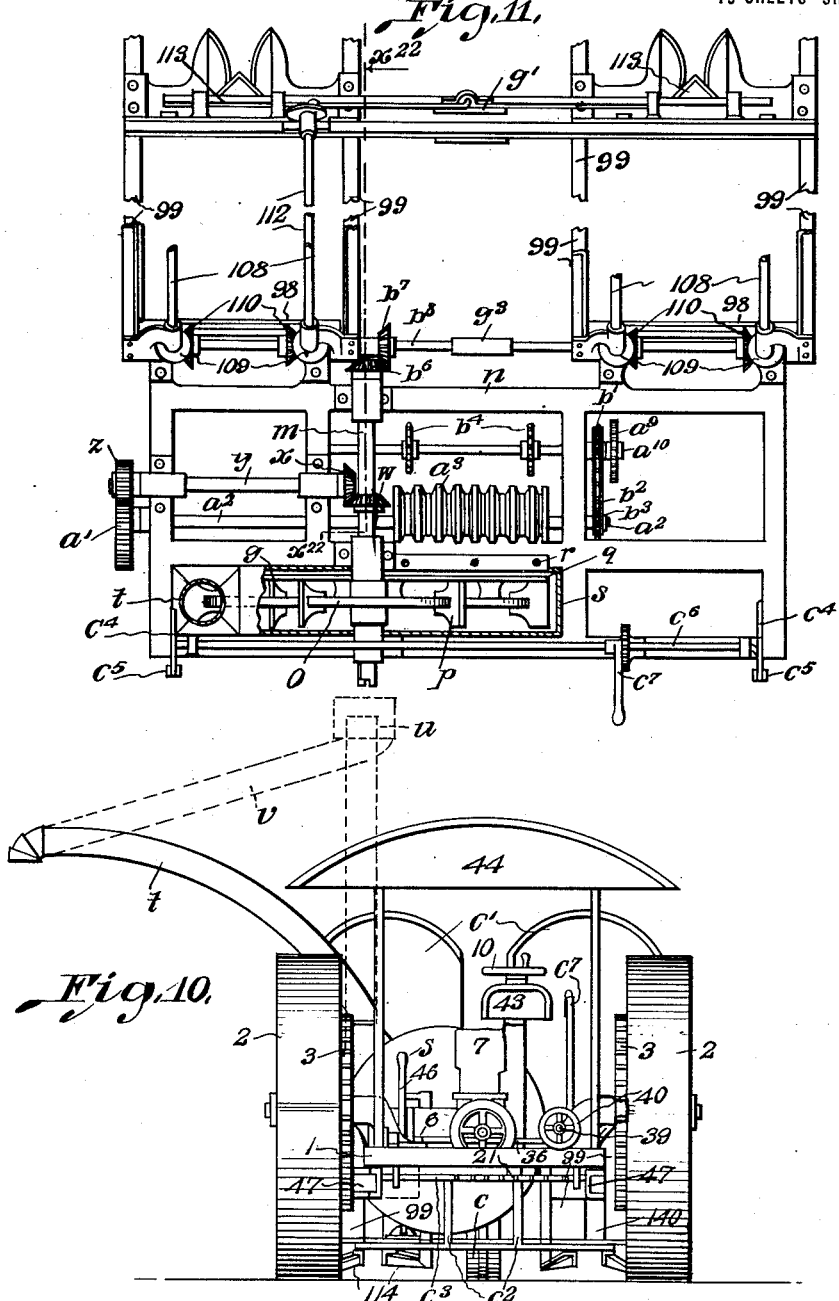

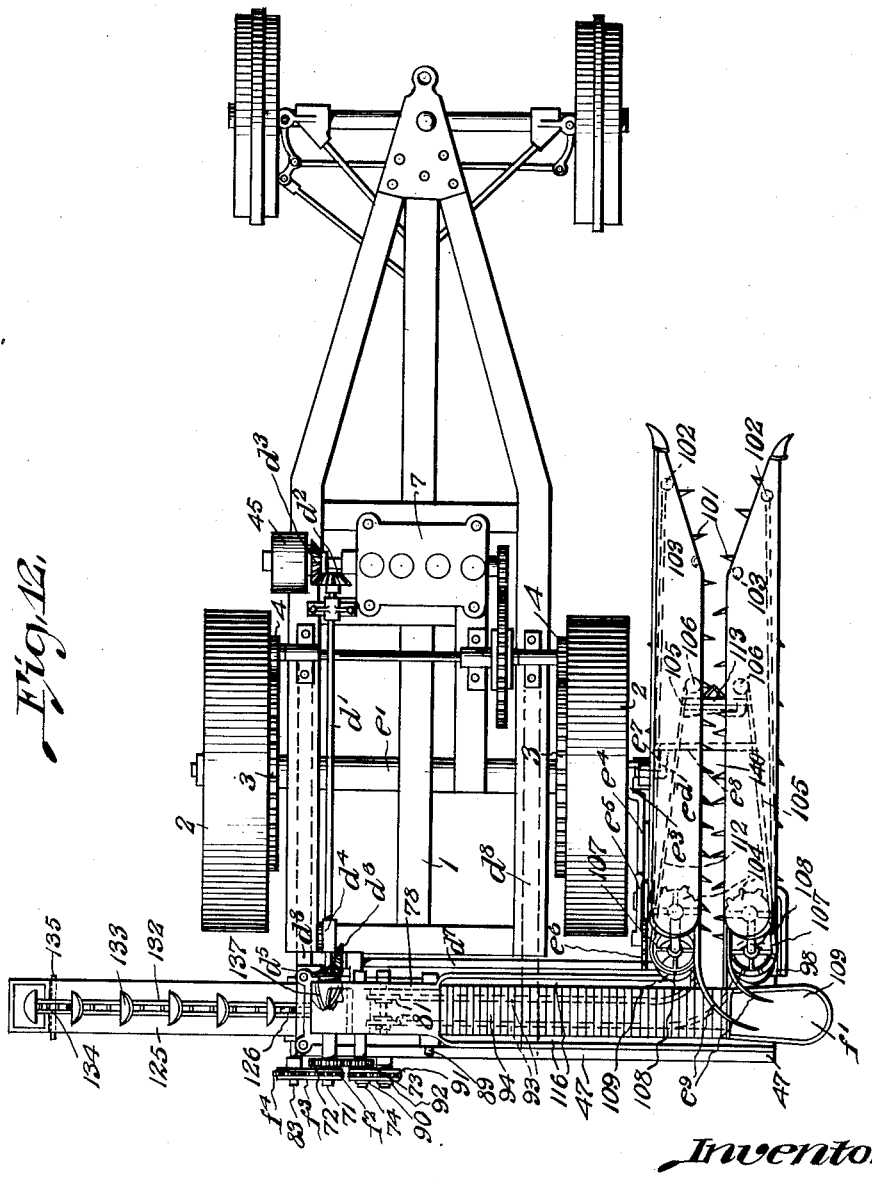

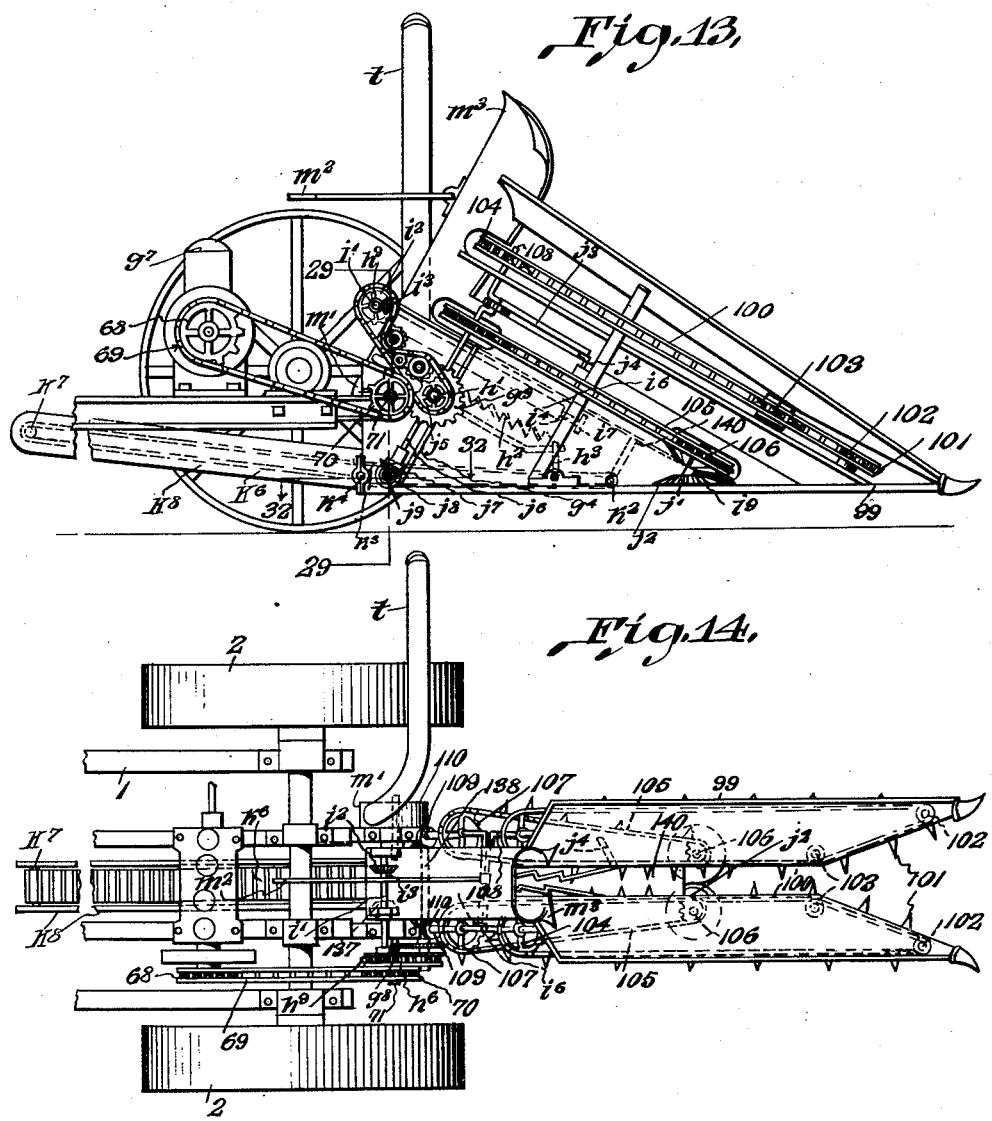

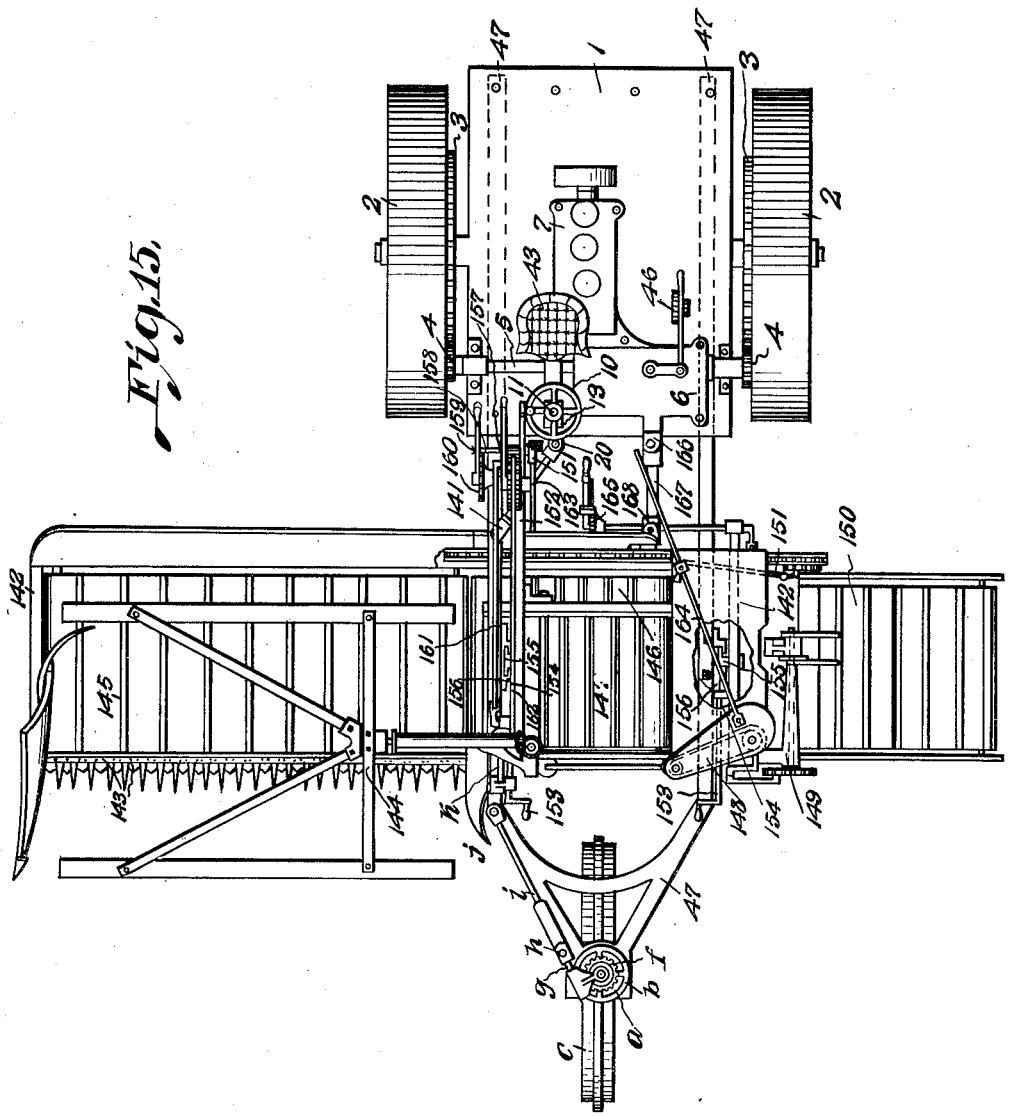

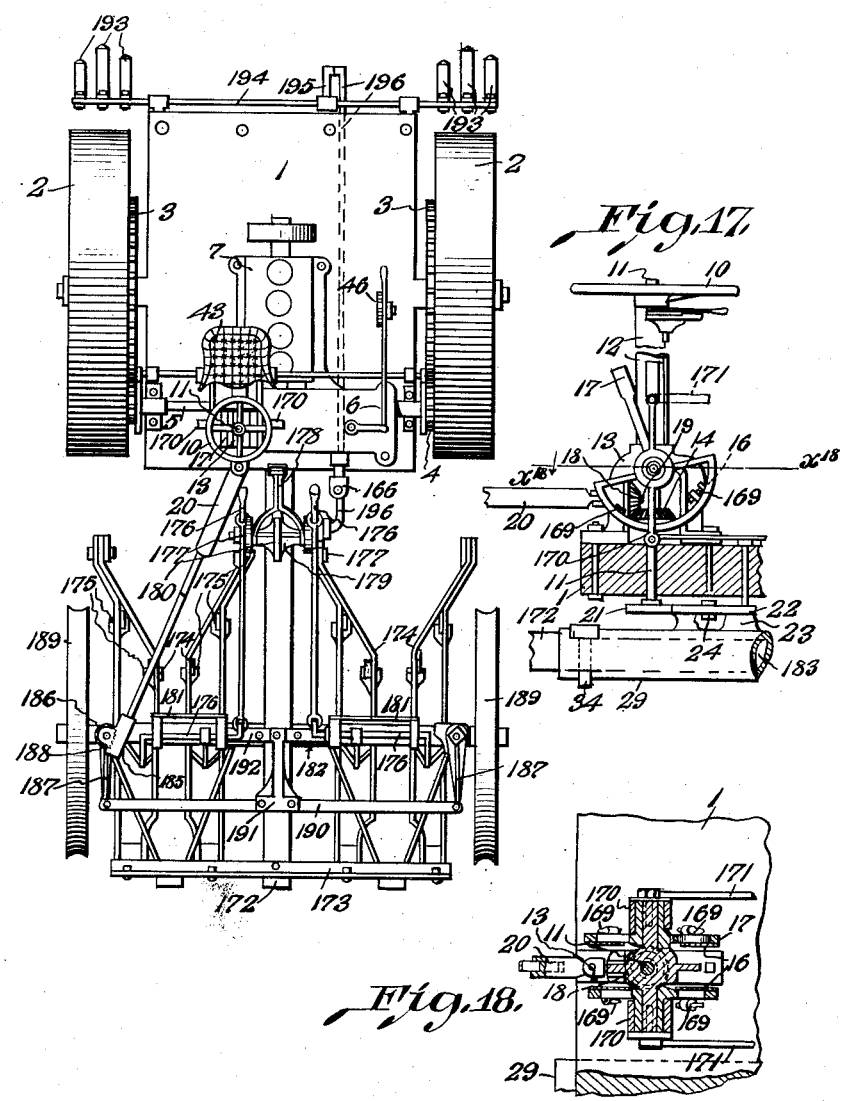

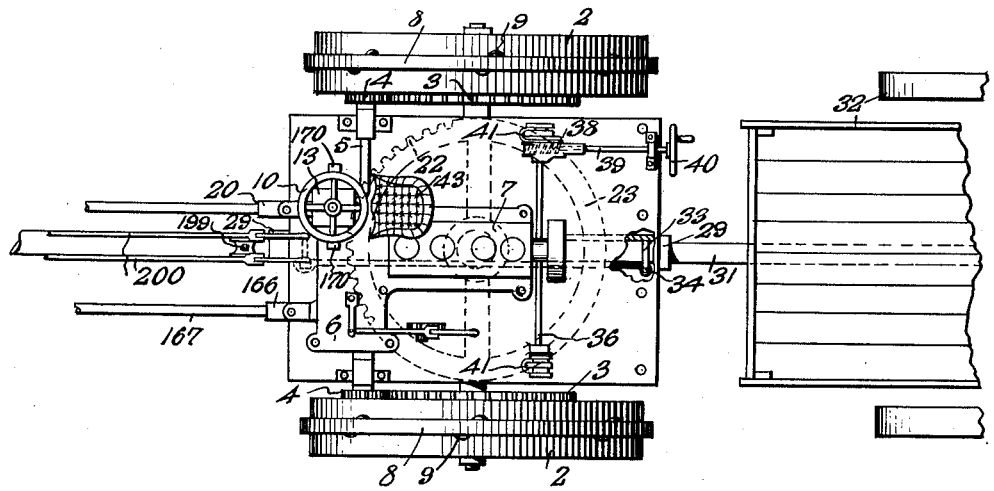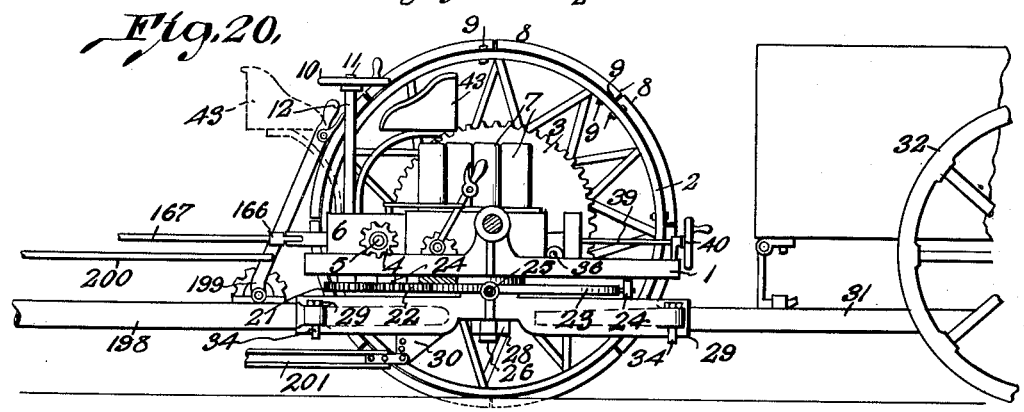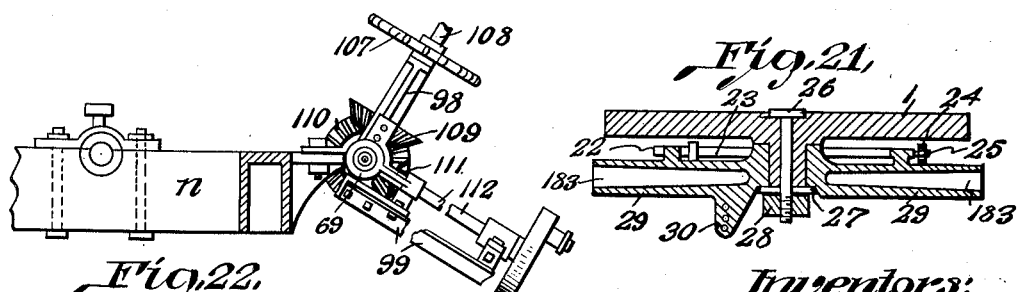

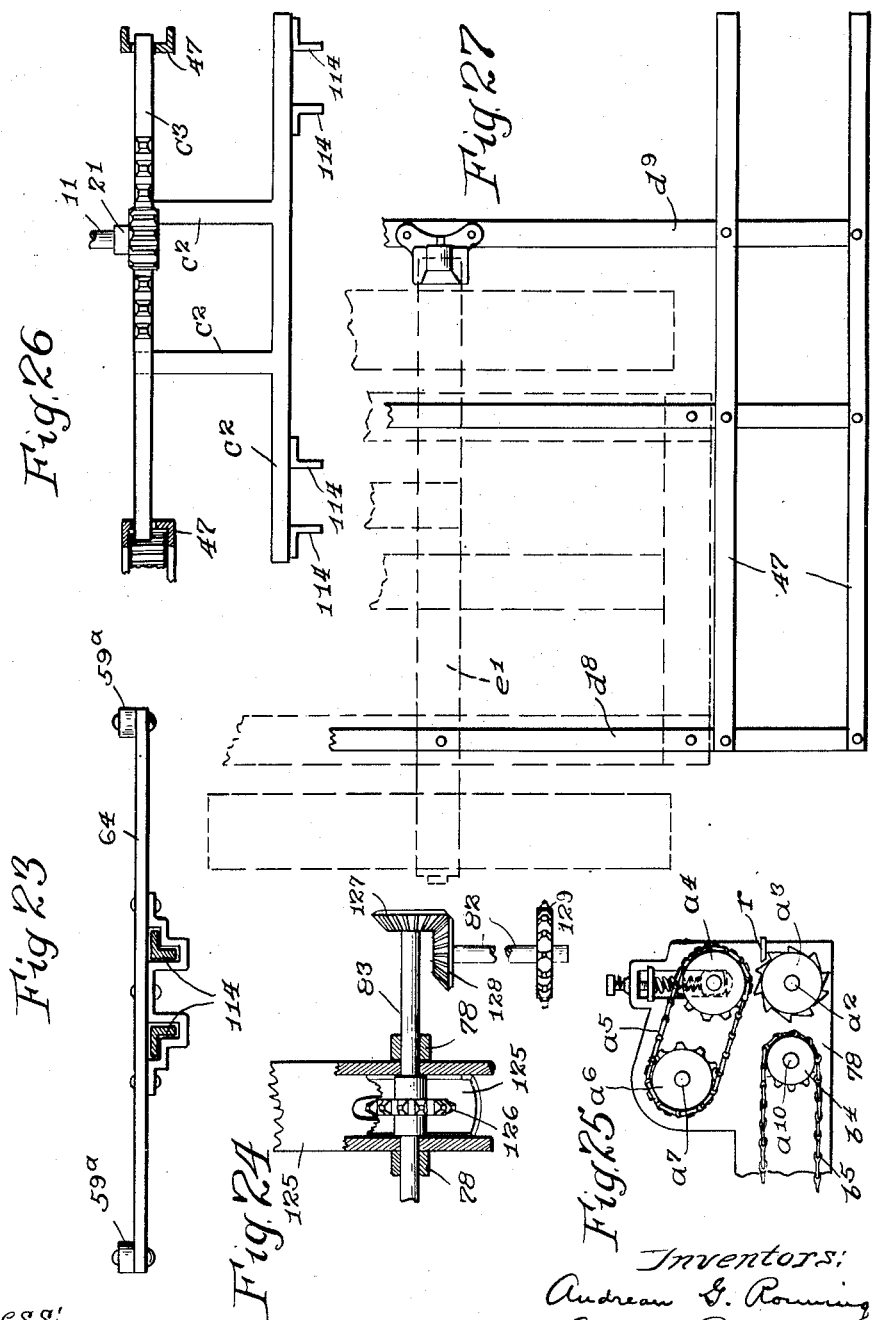

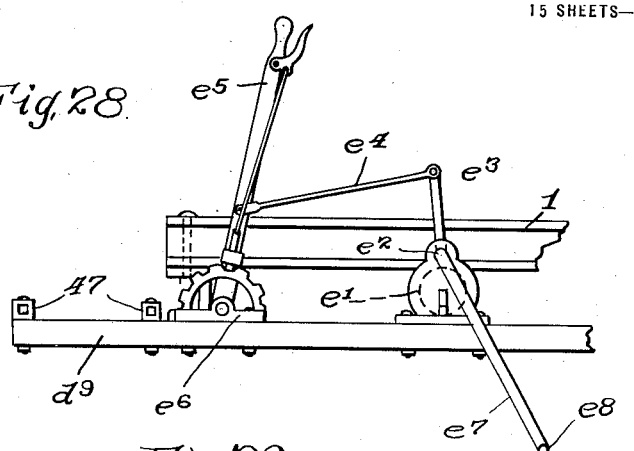
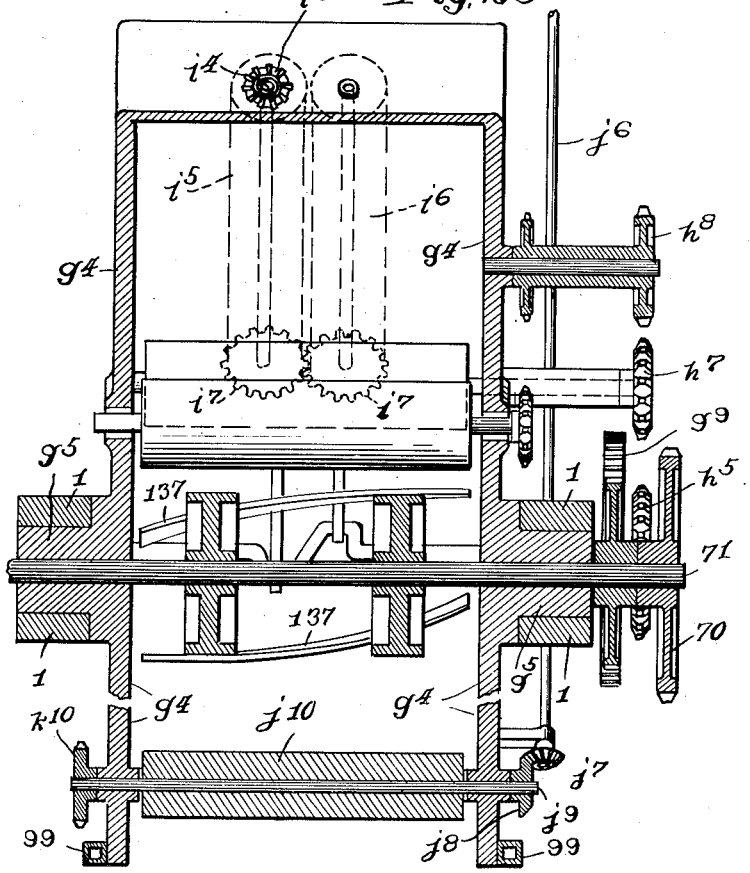
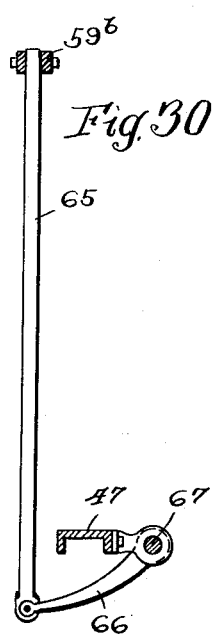

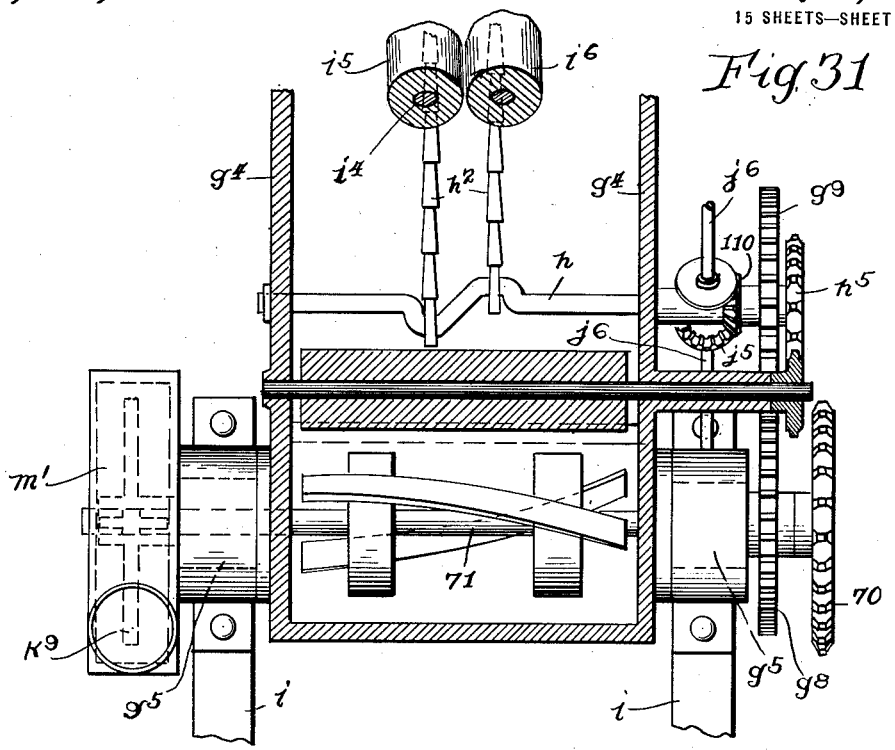
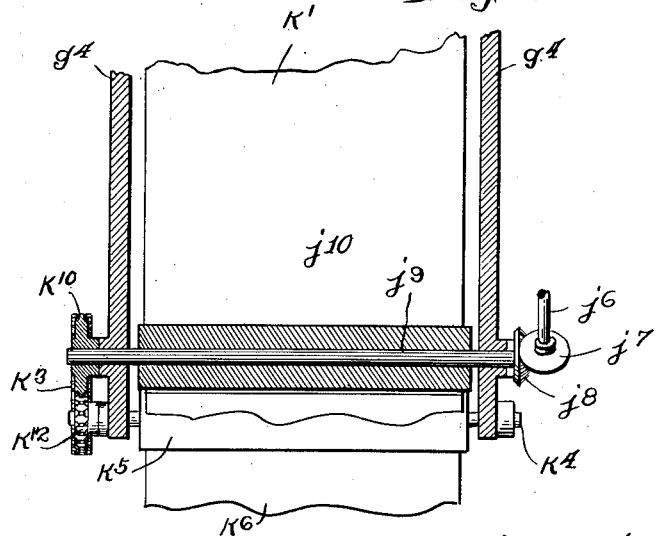

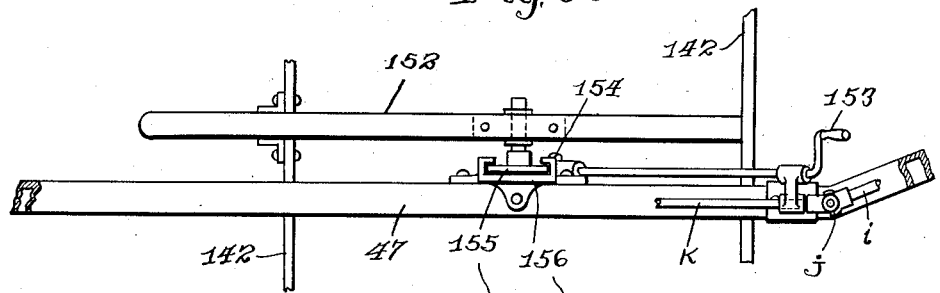
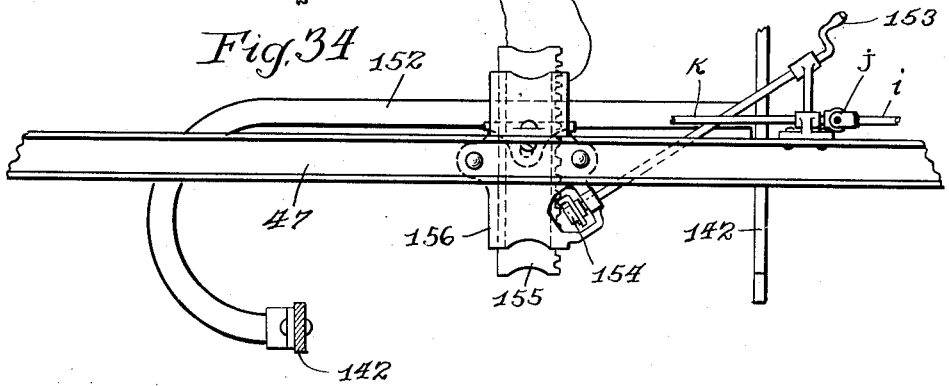
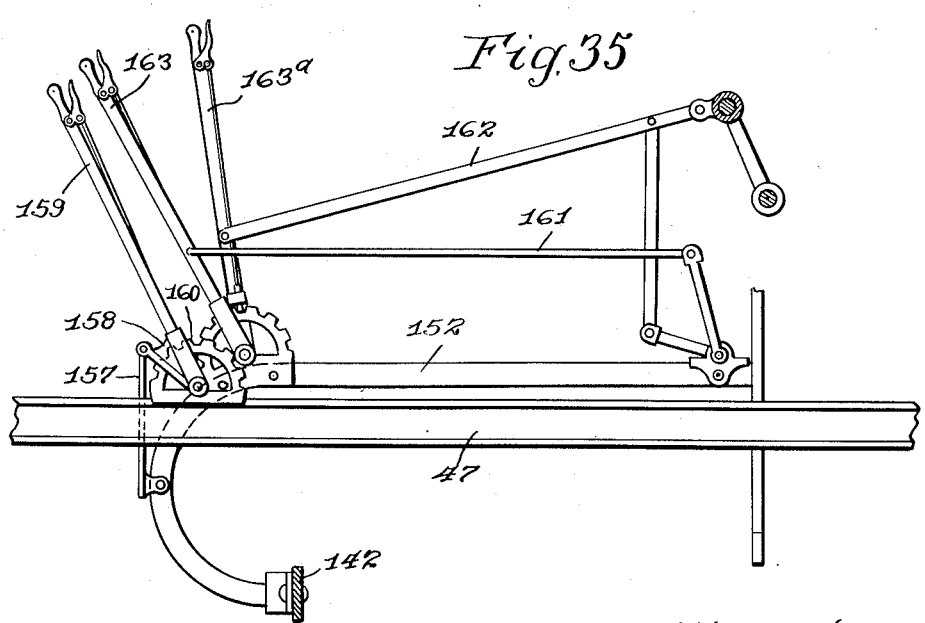

A. G. AND A. RONNING.
COMBINATION TRACTOR IMPLEMENT.
APPLICATION FILED MAR. 6, 1916.

1,340,461. Patented May 18, 1920.
15 SHEETS—SHEET 15.

Witness:
L. B. Graham

Inventors:
Andrew G. Ronning,
Adolph Ronning,
By Adams Jackson
Attys.

UNITED STATES PATENT OFFICE.

ANDREAN G. RONNING AND ADOLPH RONNING, OF MINNEAPOLIS, MINNESOTA.

COMBINATION TRACTOR IMPLEMENT.

1,340,461.     Specification of Letters Patent.     Patented May 18, 1920.

Application filed March 6, 1916. Serial No. 82,516.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Combination Tractor Implements; and we do hereby declare the following to be a full, clear, and exact description, such as will enable others skilled in the art to which it appertains to make and use the same.

Our invention has for its object to provide a highly efficient combination tractor implement having various interchangeable attachments which adapt the machine to do various kinds of work. For instance, with an ensilage harvester attachment attached to the tractor the machine may be used to harvest corn and the like and cut the same into ensilage, and deposit the same in the box of a wagon driven by the side of the machine. With the ensilage harvester attachment removed and a binder or header-binder attachment substituted therefor, the machine may then be used as a tractor-harvester to harvest grain and the like. With the header-binder attachment removed and a corn picker attachment substituted therefor, the machine may be used as a tractor-corn picker to harvest and clean the corn ears from the corn stalks, remove the husks and deposit the ears in the box of a wagon driven by the side of the machine. If the ensilage harvester attachment and corn picker attachment are built into one attachment so as to perform the functions of both in the one operation, the machine may then be used as a tractor operated - ensilage harvester - corn picker to harvest the standing corn off the field, remove the ears therefrom and deposit the husked ears into the box of a wagon, which in this case is preferably attached to the tractor at the rear of the machine, and to cut the corn stalks into ensilage and deposit the same in the box of a wagon driven alongside of the machine. With the corn-picker ensilage-harvester attachment removed and a corn cultivator attachment substituted therefor the machine may be used as a tractor-cultivator, to cultivate corn and the like. With the cultivator attachment removed and a plow attachment substituted therefor the machine may be used as a tractor-plow to do the necessary plowing on a farm in an efficient manner. With the plow attachment removed and a truck attachment substituted therefor the machine may be used as an auto-truck to haul hay, grain and do the general truck work on a farm. Besides being especially adapted for these special attachments the tractor is provided with a universal hitch so as to enable one to use it in connection with any implement the farmer now already has on his place.

Another object of the invention is to attach the various harvester attachments to the tractor in such a way as to make it practical and convenient to also attach a disk pulverizer or the like directly to the tractor so as to enable the farmer to cultivate his field before the bundles are shocked, thereby conserving the moisture of the soil and starting the weed seeds to grow as soon as possible.

Another object of the invention is to provide a tractor element with a universal steering device which may be operated by the hands or the feet or by both, which may be used for directing the vehicle when the ordinary farm implements are attached thereto which may be used in connection with all the above named attachments for steering the tractor and which is so designed as to operate in conjunction with a certain clutch device thereby enabling the vehicle to turn square corners and to turn in as short a radius as possible.

Another object of the invention is to adapt these various attachments to the tractor and the tractor to the attachments in such a way as to place all the regulating and operating devices of these attachments, when attached to the tractor, within easy reach of the operator and at the same time leave these regulating and operating devices permanently secured to the attachments thus avoiding the necessity of making a large number of adjustments and changes that otherwise it would be necessary to make when coupling up the various attachments, which are designed to do different kinds of work, to a common tractor element.

Another object of the invention is to provide the tractor element with a universal hoisting device having means for lifting the various attachments into their desired positions with relation to the tractor element so as to enable one to easily and quickly remove an attachment and replace it with another.

Besides showing our preferred ensilage harvester attachment and our preferred type of tractor adapted for coöperative association therewith, we aim to show a few modifications thereof so as to enable one to make these ensilage harvester attachments work in the best possible manner when attached to any of the well known make of tractors, and also to show an ensilage harvester attachment which is designed to cut two rows at the same time and has but one ensilage cutter which receives material from both rows, so as to enable those who do custom work to have a large capacity machine.

Another object of the invention is to provide the ensilage harvester attachment with a self-steering device which is designed to work in coöperation with the steering device of the tractor to which it is attached so as to enable one man to easily operate the combined tractor-ensilage-harvester.

These together with other objects will become more apparent from the following general and detailed description and the illustrations given in the accompanying drawings.

In the accompanying drawings which illustrate the invention, like characters indicate like parts throughout the several views.

Referring to the drawings: Figure 1 is a side elevation of the improved machine, with our preferred form of ensilage harvester attachment; Fig. 2 is a plan view of the machine with our preferred form of ensilage harvester attachment applied thereto; Fig. 3 is an enlarged detail view taken from Fig. 2 showing the front end of the ensilage cutter including the casting on which the gathering frames, including the sickle mechanism are attached, with some parts broken away; Fig. 4 is a fragmentary view in side elevation showing the manner in which the said gathering frames are pivotally attached to the front portion of the casting as shown in Fig. 3; Fig. 5 is a side elevation of Fig. 3 with some parts not shown; Fig. 6 is a detail in side elevation of the so-called hoisting device with some parts broken away; Fig. 7 is a front elevation of the steering knuckle of the front wheels shown in Fig. 1 and Fig. 2 with the wheel removed and showing the raising and lowering device incorporated therein; Fig. 8 is a side elevation of the two row ensilage harvester attachment as applied to the tractor; Fig. 9 is a plan view of the two row ensilage harvester attachment as applied to the tractor; Fig. 10 is a rear elevation of the tractor with the two row ensilage harvester attachment attached thereto; Fig. 11 is a fragmentary plan view of the two row ensilage harvester attachment showing the sickle mechanism therefor, and the ensilage cutter and frame with the two sets of gathering frames pivotally attached thereto, with some parts broken away and some parts not shown; Fig. 12 is a plan view of an ordinary four wheel type of tractor showing the ensilage harvester attachment as applied thereto with some parts not shown and some parts broken away; Fig. 13 is a fragmentary side elevation of the tractor showing the combined ensilage harvester and corn picker as applied thereto; Fig. 14 is a plan view of Fig. 13; Fig. 15 is a plan view of the header-binder attachment as applied to the tractor with some parts not shown; Fig. 16 is a plan view of the corn cultivator attachment as applied to the tractor with some parts not shown; Fig. 17 is a side elevation of the tractor steering mechanism and engine controlling mechanism, some parts being in section and some parts broken away; Fig. 18 is a horizontal sectional view of the said steering mechanism and engine controlling mechanism taken approximately on the line $x^{18}$ $x^{18}$ on Fig. 17, some parts not being shown; Fig. 19 is a plan view of the tractor showing part of the universal hitch and steering device in dotted lines and a truck attached thereto at the rear thereof and the tongue of another vehicle attached at the front thereof, some parts being broken away and some parts not shown; Fig. 20 is a side elevation of Fig. 19 with one of the tractor's drive wheels removed; Fig. 21 is a detail in vertical section showing part of the universal hitch and steering device which is also shown in Figs. 19 and 20; Fig. 22 is a detail being a vertical sectional view taken approximately on line $x^{22}$ $x^{22}$ on Fig. 11 with some parts not shown.

Fig. 23 is a front elevation of the guide-bar by which the front wheels of the machine shown in Fig. 2 are steered, showing the steering devices connected thereto certain parts being in section;

Fig. 24 is a view, partly in section, illustrating the lower end portion of the elevator-frame shown in Fig. 2 and the gearing associated therewith;

Fig. 25 is a detail illustrating the ensilage cutter feed-roller and parts coöperating therewith;

Fig. 26 is an elevation illustrating certain of the steering connections employed in the two-row ensilage harvester shown in Fig. 9;

Fig. 27 is a plan view illustrating the brackets by which the ensilage harvester attachment shown in Fig. 12 is applied to the tractor frame;

Fig. 28 is a partial side elevation showing the mechanism for adjusting the gathering frame in the construction shown in Fig. 12;

Fig. 29 is a partial sectional view on line 29—29 of Fig. 13;

Fig. 30 is a partial vertical cross-section on line 30—30 of Fig. 2, illustrating some of the steering connections;

Fig. 31 is a partial sectional view, illustrating the ensilage cutter cylinder shaft, the husking and snapping rollers, and the connections for driving the same;

Fig. 32 is a sectional view illustrating the manner of driving the conveyer belts used in the construction shown in Figs. 13 and 14, being a horizontal section on line 32—32 of Fig. 13.

Fig. 33 is a partial plan view showing the construction employed for vertically adjusting the parts of the binder mechanism shown in Fig. 15;

Fig. 34 is a side view of the parts shown in Fig. 33;

Fig. 35 is a partial side elevation illustrating the lever mechanism for adjusting said harvester mechanism;

Figure 1:
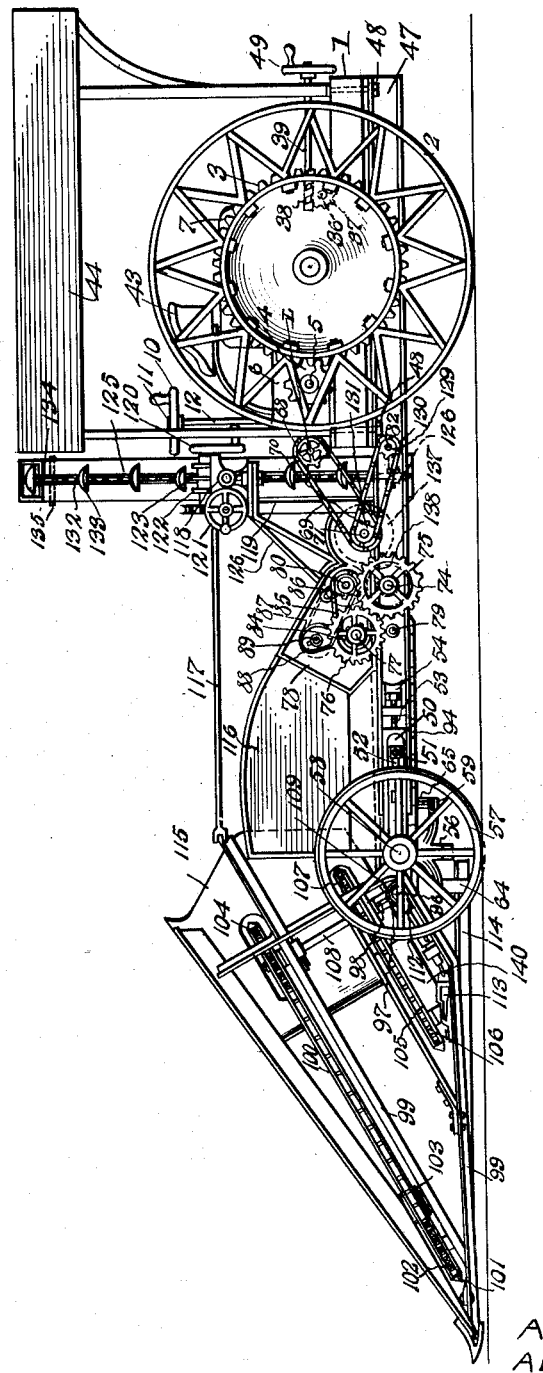
Figure 36:
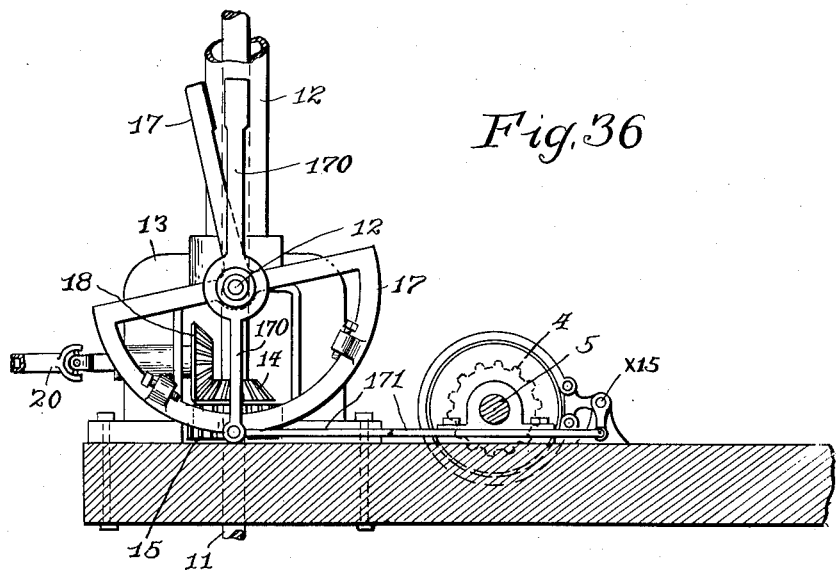
Fig. 36 is an enlarged detail illustrating certain parts of the steering mechanism.
Figure 37:
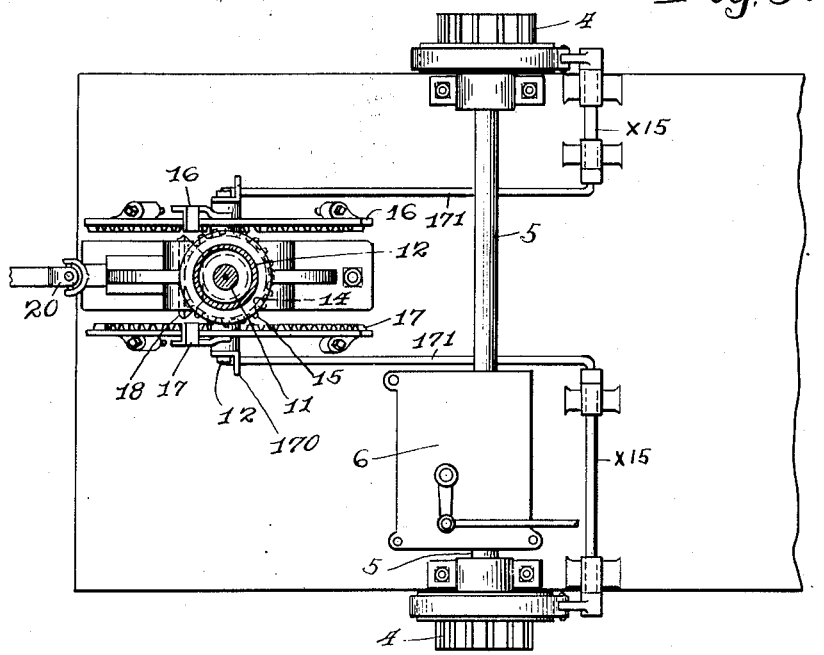
Fig. 37 is a plan view of the forward portion of the tractor, illustrating the steering mechanism, certain parts being in section.

The general construction of the tractor element as illustrated in Figs. 1, 2, 8, 9, 10, 15, 16, 17, 18, 19, 20 and 21 will first be described. The main frame 1 of this tractor is carried by and nearly balanced on the drive wheels 2 which carry on their inner sides, spur gears 3 which mesh with spur gears 4 which are carried on the outer and free ends of the differential shafts 5 which are suitably journaled on the main frame 1 and in the differential housing 6 and connected to the engine mechanism 7 by any well known and approved differential mechanism and clutch mechanism ordinarily employed for such purposes. Engine mechanism 7 may be of any well known and approved construction and preferably of the four cylinder type and should be mounted on the main frame 1 as near the center thereof as possible so as to place the weight in the proper place and so as to reduce the vibration of the engine. Drive wheels 2 may be constructed in any well known and approved manner, with solid rubber tire or with the usual steel rim tire, or they may be of any well known caterpillar type and may be attached to the main frame 1 in any well known and approved manner. The caterpillar type traction wheel or traction element is preferably used where the soil is soft. A relatively high traction wheel is preferably used when the tractor is used in connection with a cultivator for cultivating corn or the like, while a solid rubber tired traction wheel is preferably used when the tractor is to be used for truck work and for running on roads at a relatively high speed. To avoid the necessity of making an extra set of wheels for truck work as well as the trouble of replacing wheels a solid rubber tire may be attached to the steel rim, which is ordinarily used for field work, in any well known and approved manner either as an entirety or in sections as shown in Figs. 19 and 20, in which numeral 8 indicates the tire sections and numeral 9 indicates the bolts for fastening them to the rim of the traction wheel.

The steering wheel 10 is attached to a shaft 11 which runs through a steering post 12 which is suitably attached to a bifurcated casting 13 (Fig. 17) which is suitably attached to the front portion of the main frame 1. Shaft 11 carries near its lower end, a beveled gear 14 which carries on its lower side a beveled gear 15 which meshes with beveled teeth 16 which are on the inner sides of the semi-circular racks of foot pedal castings 17 which are pivotally attached to the sides of the bifurcated casting 13. See Figs. 17 and 18. Thus by turning steering wheel 10 forth and back, the foot pedals of the castings 17 will move forth and back or vice versa by moving the foot pedals of the castings 17, back and forth, the steering wheel 10 with the shaft 11 and attached beveled gear 14 will turn forth and back. Beveled gear 14 meshes with a beveled gear 18 which is secured to a pin 19 which is journaled in the casting 13. Pin 19 is secured to a universal knuckle 20 which is suitably attached to the steering mechanisms of the various attachments which may be at various times attached to the tractor. Thus the tractor with its attached implement may be guided or directed in any desirable manner by simply moving the said foot levers or by turning the steering wheel 10.

Shaft 11 also carries at its lower end, a spur gear 21 which meshes with the spur teeth 22 (Fig. 19) of the universal hitch wheel 23 which is pivotally attached to the under side of the tractor frame 1. Rollers 24 are suitably journaled on pins 25 (Figs. 20 and 21) which are suitably attached at the circumference of the universal hitch wheel 23 and in such a manner as to allow the said rollers 24 to ride on a circular track which is provided for this purpose on the under side of the tractor frame 1 so as to facilitate the turning of the said wheel 23 when it is connected to main frame 1, as by bolt 26, washer 27 and nut 28 as best shown in Figs. 20 and 21. Universal hitch wheel 23 is also provided with hitch members 29 and 30. The hitch member 29 is hollow so as to admit the insertion of the tongue 31 of a wagon or truck 32 as illustrated in Figs. 19 and 20. Said wagon tongue 31 is provided with a groove 33 cut around it so that it may be securely locked to the tractor when the square keys 34 are inserted in the outer ends of the hitch member 29 in such a manner as to allow the said tongue 31 to freely turn when locked to the tractor. This arrangement will allow the vehicle attached to the tractor to freely pass over rough places and obstructions without having its main frame twisted. Thus, the tractor may be guided and directed by turning the said universal hitch wheel 23 by means of the steering wheel 10.

The above described coupling may be done with equal ease from either end of the tractor and the implement already attached may remain attached until the tractor is hitched at the other end or is in a desirable position to be hitched to the implement, the farmer wants attached thereto, so as to avoid tipping the tractor when transferring it from one implement to another.

Shaft 36 is suitably journaled in the tractor frame 1 and carries at one end, a worm gear 37 which meshes with a worm 38 which is secured to the front end of a shaft 39 which is suitably journaled and secured to the main frame 1 and which carries at its rear end, a hand wheel 40. Chains, or cables 41 as shown, are suitably attached to the end portions of the shaft 36 and at their free ends to hooks 42 as shown best in Figs. 2 and 6. Thus by attaching hooks 42 to the desired attachment the said attachment may be easily raised to the tractor frame into a desirable position to be locked or bolted thereto by turning the hand wheel 40, or it may be lowered again from the tractor frame to the ground, by turning the said hand wheel 40 in the opposite direction.

We propose to control the engine from the steering post 12 by means of mechanisms ordinarily employed in trucks and automobiles for similar purposes, so it is not deemed essential to give a detailed description thereof herein.

The seat in its entirety is indicated by the numeral 43 and is attached to the tractor frame 1 in any well known and approved manner on either side of the steering post 12. The position of the seat when the tractor is adapted for plowing and similar work in which case the tractor is run in the opposite direction, is shown in dotted lines in Fig. 20.

The top in its entirety is indicated by the numeral 44 and may be constructed and secured to the tractor frame 1 in any well known and desirable manner.

The tractor may be provided with the usual friction clutch belt pulley mechanism which is indicated in its entirety by the numeral 45 and which may be put in and out of action by the lever mechanism 46 which is of any well known and approved construction.

We shall next describe the various attachments for the tractor commencing with our preferred form of ensilage harvester attachment shown in Figs. 1 to 7 inclusive. The frame 47 of the ensilage harvester attachment is detachably secured to the main frame 1 of the tractor in any desirable manner as for instance by means of bolts 48 which pass through the tractor frame 1 and through the apex of cones 49 which are suitably secured to the top of the frame 47 and which are designed to fit into suitably constructed sockets in the said tractor frame 1 when the said frame 47 is lifted into close engagement with the tractor frame 1 by means of the already described hoisting mechanism. Thus by means of the said bolts 48 the frame 47 may be secured to the tractor frame as illustrated in section by Fig. 6. Such an arrangement will make it easier to get the attachment frame 47 to the desired place on the tractor frame 1 when hoisted thereto and attached thereto by the operator.

The front end of the said frame 47 is attached to a casting 50 by means of bolts 51 with freedom for longitudinal adjustments which are afforded by slots 52, such adjustments being facilitated by means of adjusting screws 53 which are suitably screwed in members 54 which are rigidly secured to the said frame 47 as best illustrated by Figs. 3 and 5. Casting 50 is provided with depending flanges through the lower extremities of which is inserted a pin 55 on which is loosely journaled at its center, the front axle 56 so as to allow the said axle 56 freedom to pivot on the said pin 55 and allow the wheels 57 which are attached to the ends thereof, freedom to rise and fall when passing over uneven soil without twisting the said frame 47. Wheels 57 are attached to the said axle 56 by means of knuckle mechanisms best illustrated in Figs. 1, 2 and 7 each of which consists of a pin 58 on which its respective wheel 57 is loosely journaled and which is secured at its inner end, to a casting 59 with freedom for vertical adjustments. Each of the castings 59 is suitably journaled at its upper and lower ends in one end of the axle 56 which is provided with bifurcated members for this purpose and as illustrated in Fig. 7. A hand wheel 60 is rigidly secured to the upper end of a threaded bolt 61 which passes through the center of the said journaled portions of the casting 59 so as to be loosely journaled therein and is provided at its lower end, with a threaded nut 62 to prevent it from slipping upward. Threaded bolt 61 passes through pin 58 which is provided with female threading so that by turning hand wheel 60 said pin 58 will be raised and lowered as desired. A pin 63 passing through hand wheel 60 and into a collar 59$^c$ which is preferably integral with the casting 59 may be employed to secure pin 58 in any desired and set adjustment. By these means the front end of the ensilage harvester attachment may be raised and lowered so as to afford means for adjusting the height from the ground at which the sickle is to be run as will be more evident hereafter. Castings 59 are also provided with arms 59ª extending forward in horizontal planes, the outer and free ends of which are pivotally attached to a common guide bar 64 as shown in Fig. 2, so as to keep the wheels 57 parallel to each other whenever they are turned by means of the knuckle mechanism already described.

The left hand casting 59 is also provided with an arm 59ᵇ extending rearward in a horizontal plane, the rearward end of which is pivotally attached to a transversely arranged guide rod 65 which is pivotally attached at its other end, to the lower end of arm 66 which is rigidly secured at its upper end to the front end of steering rod 67 which is suitably journaled upon the frame 47 as best shown in Fig. 30 and which is attached at its rear end to the knuckle 20 in any well known and approved manner so that by turning the steering wheel 10, the front wheels 57 may be turned in any desirable manner for steering the machine. See Fig. 2 and Fig. 17.

The clutch and pulley mechanism already described may also be provided with a sprocket wheel 68 suitably connected with the belt pulley thereof and over which runs a sprocket chain 69 which runs in its forward loop over a sprocket wheel 70 suitably secured to the cylinder shaft 71. Said shaft carries a spur gear 72 which meshes with a spur gear 73 secured to the lower feed roller shaft 74 which is suitably journaled at its ends and is provided with any well known type of feed roller. Said shaft 74 is provided at its other end with a spur gear 75 which meshes with an idler spur gear 76 loosely journaled on a pin 77 which is suitably attached to an ensilage cutter head frame 78 which is suitably attached to the frame 47 and is provided with bearings for the said shafts 74 and 71 and also for the shafts 79, 80, 82 and 83. A sprocket wheel 84 is rigidly attached to spur gear 76 and carries sprocket chain 85 which runs in its rearward loop over a sprocket 86 which is secured to the said shaft 80 which is provided with suitable sprocket wheels 87. Said apron runs in its forward loop over sprocket wheels 88 attached to the shaft 89 which is suitably journaled in the ensilage cutter head frame 78. Shaft 74 carries a sprocket wheel 90 over which runs a sprocket chain 91 which runs in its downward loop over a sprocket wheel 92 secured to the said shaft 79, which carries sprocket wheels 81 over which run the sprocket chains 93 to which are attached the ensilage cutter feed apron slats 94. Said chains 93 run in their forward loop over sprocket wheels 95 which are secured to a shaft 96 suitably journaled in the front end of the casting 50 which is provided at this point with sleeves 97 to which a gathering frame casting 98 is pivotally attached as shown in Fig. 4. A pair of laterally spaced gathering frames 99 are rigidly secured connected by bolts or otherwise to casting 98. The top boards or plates of these gathering frames 99 incline downwardly toward the front and their front inner edges diverge so as to guide the standing corn stalks into the channel left between the said gathering frames. Such movements of the corn stalks is further insured by endless conveyers in the form of sprocket chains which are provided with projecting teeth. As shown, there are four of these sprocket chains, all inclined upwardly from front to rear and positively driven through connections which will presently be described. The relatively long upper sprocket chains 100 are provided with teeth 101 and they are arranged to run over sprocket wheels 102, 103 and 104 suitably mounted on the gathering frames 99. The relatively short lower sprocket chains 105 are arranged to run over sprocket wheels 106 and 107, also mounted on the gathering frames 99. Sprocket wheels 102, 103 and 106 are idler sprocket wheels, but sprockets 104 and 107 are driving sprocket wheels that are secured on oblique shafts 108 which are suitably journaled in the gathering frames 99 and in gathering frame casting 98 and are provided at their lower ends with beveled gears 109 that mesh with beveled gears 110 that are secured to shaft 96. The right hand beveled gear 110 also meshes with beveled gears 111 which is secured to the rear end of a crank shaft 112 which is suitably journaled in the casting 98 and on one of the gathering frames 99 and carries at its front end a well known and approved means for driving a sickle 113, adapted for use in cutting the corn off the field. This sickle 113 is of the usual well known construction and is mounted in suitable bearings which are secured to the gathering frames 99. Immediately back of the said sickle 113 a U shaped chute 140 is arranged to receive the stalks from the said sickle and deliver then at its rear end, to the ensilage cutter feed apron slats 94.

A pair of diverging angle irons 114 are pivotally attached to the front and lower points of the gathering frames 99 while their rearwardly extending ends are mounted upon the central portion of the guide bar 64 so as to move transversely therewith but with freedom to slide forth and back when the gathering frames 99 are tilted up and down, and in such a manner as to leave a channel between them for the standing corn stalks and stubble of the field to pass through as illustrated in Fig. 23. By this construction if either of the gathering frames 99 comes too close to the row of corn stalks, these corn stalks and stubble will exert pressure against the angle irons 114 thereby moving said bar 64 transversely of the machine and causing the front wheels 57 to turn until the said pressure is relieved. Thus after the operator has directed the machine into the row by means of the steering wheel 10, the machine will be guided automatically as it moves through the field cutting up its row of corn stalks.

A stalk deflector 115 is rigidly secured to the gathering frames 99 to direct the stalks so that they will be carried by the ensilage cutter feed apron slats 94 butt ends first into the ensilage cutter so as to be fed thereby butt ends first into direct engagement with the feed rollers already described. And to further direct the stalks in their already described movements into the ensilage cutter, the machine is provided with guide boards or deflectors 116 which are rigidly, but detachably secured to the ensilage cutter head frame 78 and to the ensilage harvester frame 47.

A cable 117 is attached to the deflector 115 and secured to the drum of an ordinary cable winding mechanism 118 mounted on a frame 119 which is secured to the ensilage cutter head frame 78 and to ensilage harvester frame 47. The cable winding mechanism 118 is operated by means of a hand wheel 120 and is of any well known and approved construction so that by turning the hand wheel 120 the gathering frames 99 may be tilted in any desirable manner. The cable winding mechanism 118 is preferably of the double drum variety having a hand wheel 121 designed to operate a second drum 122 to which is attached a cable 123 attached at its other end to a stirrup 124 which is pivotally attached at a suitable point to an elevator frame 125 suitably mounted upon the ensilage cutter head frame 78 at right angles to the ensilage harvester frame 47 and braced thereto by means of a brace rod 126 in any well known or suitable manner. As best shown in Fig. 24, the lower inner end of the elevator frame 125 is provided with a sprocket wheel 126' mounted upon a shaft 83 which carries at its rear end a beveled gear 127 in mesh with a beveled gear 128 secured to the inner end of a counter shaft 82 which carries at its outer end, a sprocket wheel 129 over which runs the sprocket chain 130, the forward loop of which runs over a sprocket wheel 131 secured to the cylinder shaft 71 thereby supplying the power from the engine for turning the said sprocket wheel 126' and through it driving a sprocket chain 132 which runs over said sprocket wheel 126' and is provided with the usual elevator buckets 133. The upper and outer loop of said chain 132 runs over a sprocket wheel 134 secured to the shaft 135 which is suitably journaled in the elevator frame 125. The shaft 135 may be provided at one end with a sprocket wheel 136 which may be used for coupling up the already described elevator mechanism of the ensilage harvester with a stationary elevator mechanism at the silo when the ensilage harvester is used at a silo, to do the work that is ordinarily done by stationary ensilage cutters. Of course, the elevator 125 may be provided with any well known and approved design of extension units so as to run directly into the silo when the ensilage harvester is used for stationary work if this should be found desirable.

Cylinder shaft 71 is provided with the usual ensilage cutter cylinder having a plurality of spirally arranged knives 137 which shear against a ledger plate 138 which is rigidly but adjustably secured to the ensilage cutter head frame 78. In fact most any well known make of ensilage cutter may be mounted in the ensilage harvester frame 47 so as to do the work of the ensilage cutter herein described so it is not thought necessary to describe all the details and improvements which may be used in connection herewith. And most of them may be thus mounted so as to receive the power necessary to run them from the tractor element coupled thereto and transmit that power to the sickle mechanism and gathering mechanism which is necessary to get the standing stalks off the field into the ensilage cutter mechanism substantially in the manner herein specified. The ensilage harvester may be easily adapted to do stationary work by the silo by making the elevator change already specified, and by removing the side boards 116 so as to enable the farmer to pitch his hay or bundles on to the ensilage cutter feed apron slats 94 and the operator to stand on the opposite side to help feed the hay or bundles into the ensilage cutter. If the farmer prefers, the entire sickle mechanism and gathering mechanism may be removed bodily from the ensilage harvester by simply detaching the cable 117 and removing the two bolts 139. It is evident therefore, that the ensilage harvester described herein may be easily converted into a stationary ensilage cutter so as to do anything the present stationary ensilage cutters are able to do, with the further advantage that it is self-propelled, and consequently easier to move from place to place. Furthermore it is easier and quicker to set our improved machine at the silo, it is more economical and convenient to operate as the operator can more easily reach the controlling devices of both the ensilage cutter and engine, and there are no belt connections between the engine and ensilage cutter to be troubled by wind or rain.

Of course the primary object of the ensilage harvester is to cut the standing stalks off the field, reduce the stalks to ensilage and deliver the ensilage into the box of a wagon driven alongside the machine, all in one continuous operation and thereby save among other things, expense of twine and especially the hard labor of pitching the heavy green corn bundles. When adapted for this work the operation of the machine will be as follows:—The operator starts the engine, and applies the drive clutch. The machine then moves forward and when the corn stalks are reached, pulley mechanism 45 is set in motion by means of lever mechanism 46, which sets the ensilage harvesting mechanisms in motion. The gathering chains 100 and 105 direct the stalks to the sickle 113 and conveys the severed portions upward and rearward through the U shaped chute 140 and deflector 115 until with thin top ends deflected forward by said deflector they are deposited in the ensilage cutter hopper, formed by side boards 116, their butt ends standing on the ensilage cutter feed apron slats 94 by which they are carried rearward into direct engagement with the feed rollers of the ensilage cutter. They are then fed by said rollers, butt ends first, to the ensilage cutter cylinder knives 137 which, in coöperation with the ledger plate 138, cuts them into small particles, and as the ensilage cutter cylinder is rotated quite rapidly, the cut ensilage is thrown rearward so as to drop upon the elevator 125 by the chain and buckets of which it is conveyed transversely to the movement of the machine, and deposited in the box of a wagon which is driven along side of the machine. Before starting to load them, these wagons may be provided with basket slings or nets so that when the loads are hauled to the silo, the ensilage may be hoisted directly from the wagons into the silo by means of a silage hoisting mechanism adapted for this purpose. Other means may of course also be provided for unloading the ensilage from the wagons into the silo, such, for instance, as a combined suction-blower mechanism or any well known dump elevator mechanism. In either case the stalks do not touch the ground from the time they are cut in the field until they are placed in the silo and no human labor is required to lift or pitch the corn stalks in harvesting the corn crop.

If the ensilage harvester be adapted to cut two rows of stalks at a time, the members of the main frame 47, which in this case are spaced farther apart at their rear end portions than in the construction shown in Fig. 2 in order to get around the blower casing $s$, are arranged so that they converge at their front ends and are curved upward and attached directly and rigidly to a casting $a$ which is provided with a female threading in engagement with the male threading of a casting $b$ which carries at its tip, a hand wheel $x$ for adjusting purposes. A wheel $c$ is loosely journaled on an axle $d$ suitably secured at its ends to the lower ends of a bifurcated casting $e$ which bears against the lower end of the casting $b$ and is provided with an upwardly extending shaft $x'$ loosely journaled in the said casting $b$. Said shaft carries at its upper end a worm wheel $f$ which is engaged by a worm $x^2$ secured to the front end of a shaft $g$ which is suitably journaled in the casting $a$ and is connected, at its rearward end, through an ordinary knuckle $h$ with a shaft $i$. The latter shaft is connected by a knuckle $j$ to a shaft $k$ which is suitably journaled upon the frame 47 and is connected, at its rear end, to the knuckle 20 of the tractor steering mechanism already described. By turning steering wheel 10 therefore the wheel $c$ may be turned so as to guide the two row ensilage harvester attachment now being described.

The ensilage cutter and elevator as shown in Figs. 1 and 2 may of course be used in the two row ensilage harvester if preferred. A fly wheel-blower type of ensilage cutter is, however, shown herein as best adapted for a two row ensilage harvester. In this case the drive shaft L of the pulley mechanism 45 may be connected up in any well known and suitable manner with the shaft $m$ which is suitably journaled in the ensilage cutter frame $n$ which is attached to the frame 47. Shaft $m$ carries a wheel $o$ which is provided with the usual blower fans $p$ and cutter knives $q$ which shear against the ledger plate $r$ which is secured in any suitable manner to the ensilage cutter frame $n$. The wheel $o$, fans $p$ and attached knives $q$ are inclosed by fan casing $s$ which is provided at one side with an opening which may lead to a blower pipe $t$ which is curved so as to direct the ensilage into the box of a wagon driven along side of the machine, or which may lead to a screened housing $u$ and to a second blower pipe $v$ as shown in dotted lines in Fig. 10. Shaft $m$ carries a beveled gear $w$ which meshes with a beveled gear $x^3$ carried by the inner end of a shaft $y$ which is suitably journaled in the ensilage cutter frame $n$ and carries on its outer end a spur gear $z$. The latter gear meshes with a spur gear $a^1$ secured to a shaft $a^2$ which is journaled in the cutter frame $m$ and provided with a feed roller $a^3$ which coöperates with a feed roller $a^4$ the latter being suitably mounted so that it is yieldingly pressed downward. Any well known ensilage cutter feed roller spring mechanism such, for example, as that illustrated in Fig. 25, may be used for this purpose and to drive an upper feed apron $a^5$ which runs, in its upward and forward loop, over sprocket wheels $a^6$ secured to the shaft $a^7$. This shaft is suitably journaled in the cutter frame $n$ and carries a spur gear $a^8$ which meshes with a spur gear $a^9$ carried by the shaft $a^{10}$ which is suitably journaled in the cutter frame $n$ and carries a sprocket wheel $b^1$ over which runs the sprocket chain $b^2$ the loop of which runs over sprocket $b^3$ which is secured to the lower feed roller shaft $a^2$. Shaft $a^{10}$ is also provided with sprocket wheels $b^4$ which drive the lower feed apron mechanism indicated in its entirety by $b^5$ suitably mounted in the frame 47 and which is constructed practically in the same manner as the lower feed apron belt illustrated in Fig. 2.

Drive shaft $m$ carries a beveled gear $b^6$ with a beveled gear $b^7$ secured to a counter shaft $b^8$ suitably journaled in the gathering frame sleeves $b^9$ of the castings 98 which are attached to the gathering frames 99 and which are pivotally attached to the front of the ensilage cutter casting frame $n$. Shaft $b^8$ carries beveled gears 110 which mesh with the beveled gears 109 which are secured to the lower end of the gathering frame drive shafts 108 which are suitably journaled in the gathering frames 99 and attached castings 98. The gathering frames 99 and the elevating and gathering mechanisms attached thereto are quite similar in construction to the gathering mechanism already described and illustrated in Figs. 1 and 2, except that the deflectors $c^1$ take the place of the deflector 115 and are so designed as to deflect the stalks from the outer gathering chains to the inner gathering chains which continue to carry the stalks with them until they are stripped and dropped therefrom upon the ensilage cutter feed apron $b^5$ in such a manner that their tops are tipped forward by the deflectors $c^1$ and their butts moved rearward into direct engagement into the feed roller and ensilage cutter mechanism as already described by the said ensilage cutter feed apron $b^5$. The stripping of the stalks is effected by arranging the inner gathering chains so that their projecting teeth are withdrawn under the margins of the inner top boards of the gathering frames 99 as they pass around the upper ends of said boards, as illustrated in Fig. 9. So too, the sickle mechanism as already described and illustrated in Figs. 1, 2, 3 and 4, may be used in either or in both the gathering mechanisms herein described. As illustrated however, in Fig. 11, both sickles may be driven from a single crank shaft 112. See also Fig. 22.

In this machine, the angle irons 114 are preferably attached to brackets $c^2$ which are rigidly attached, at their upper ends, to a cross bar $c^3$ which is suitably mounted, at its ends, in the frame 47, with freedom to slide back and forth, as shown in Fig. 26. Cross bar $c^3$ is provided with rack teeth on its rear side which mesh with the spur gear 21 so that when the standing corn stalks of the field exert sufficient pressure against either of the angle irons 114 as the machine is moving forward, the steering mechanism of the machine, as already described, will be actuated so as to turn the wheel $c$ so as to automatically steer the machine so as to properly follow the corn rows.

Cables $c^4$ are suitably attached to the gathering frames 99 and to crank arms $c^5$ carried by a crank shaft $c^6$ which is suitably journaled in the casting $n$ and which is provided with any well known and approved lever mechanism $c^7$ so as to enable the operator to easily tilt the gathering frames 99 and secure them in any desired adjustment.

In this manner an ensilage harvester may be built so as to cut and feed two rows at the time into a common ensilage cutter which delivers the cut ensilage from the machine by means of a blast of air through its blower pipe $t$ into the box of a wagon driven by the side of the machine.

We shall next describe the modification of ensilage harvester attachment as illustrated in Fig. 12. It is evident that the sickle mechanism employed by the ensilage harvester attachment illustrated in said figure and the gathering frames and incorporated gathering mechanism employed for cutting the standing stalks off the field and delivering the severed stalks into the ensilage cutting mechanism, together with the ensilage cutting mechanism and the elevator receiving and delivering therefrom are substantially the same as is the similar and corresponding parts designated by like characters already described and illustrated and described in Figs. 1, 2, 3, 4 and 5. The modification consists principally in such changes and in the addition of such devices as will enable one to use the said devices in connection with tractors which have not been especially designed for ensilage harvester work and which consequently have not been especially adapted to the ensilage harvester attachment already described. In Fig. 12, the main frame and ground wheels of an ordinary form of tractor are shown, together with parts of the driving mechanism, engine mechanism and belt pulley clutch mechanism sometimes employed therein, which are indicated by figures corresponding to similar parts already described. The transmission of power from such a tractor to the ensilage harvester attachment as adapted thereto may be accomplished by means of a shaft $d^1$ which is suitably journaled in the tractor frame 1 and is provided with a beveled gear $d^2$ which meshes with a beveled gear $d^3$ of said belt pulley mechanism 45. Shaft $d^1$ may be connected up directly with the ensilage cutter cylinder shaft 71 by any well known and approved coupling device $d^4$. Sprocket wheels 70 and 131 may be removed and a beveled gear $d^5$ substituted therefor. Beveled gear $d^5$ meshes with a beveled gear $d^6$ mounted on a transverse counter shaft $d^7$ which is suitably journaled on the ensilage harvester frame 47 and in this case, replaces the shaft 96 illustrated in Figs. 1 to 5 inclusive. The said frame 47 is attached to the tractor frame 1 by means of brackets $d^8$ and $d^9$ which are suitably connected with the rear axle $e^1$ of the said tractor, as shown in Figs. 27 and 28.

Sleeves 97 on which the said gathering frames 99 are pivotally attached, are in this case attached directly to the side of the said frame 47 in such a manner as to allow the said frame 99 with its attached casting 98 freedom for pivotal adjustments. A shaft $e^2$ is suitably journaled on the bracket $d^9$ and carries, on its inner end, an upwardly extending arm $e^3$ pivotally connected, at its upper end, to a guide rod $e^4$ which is pivotally attached at its rear end to a vertically extending lever handle $e^5$ which is pivotally mounted, at its lower end, on a quadrant $e^6$ carried by the bracket $d^9$. Lever handle $e^5$ is provided with the usual lever mechanism to engage the teeth of the quadrant $e^6$ so that it may be secured in any set adjustment. Shaft $e^2$ is provided, at its outer end, with a forwardly and downwardly inclined crank arm $e^7$ which is rigidly secured at its lower end to a pin $e^8$ at right angles thereto as shown in Figs. 12 and 28. Pin $e^8$ is suitably journaled in the frame 99 with freedom to slide forward and rearward therein when tilted by means of the lever mechanism just described. Guide fingers $e^9$ are suitably attached to the upper portion of the gathering frame 99 and curve outward so as to direct the tops of the stalks into the hopper $f^1$ and if the chute 140 terminates on the front side of the ensilage cutter feed apron belt, the stalks will be deposited thereon by the gathering chains 103 and carried by the said ensilage cutter feed apron transversely to the movement of the machine, butt ends first into direct engagement with the feed rollers and ensilage cutting mechanism already described. If the U shaped chute 140 be extended across the said feed apron, as indicated in dotted lines and if the curved feed fingers $e^9$ be turned in the opposite direction as indicated in dotted lines, the stalks will tip in the opposite direction from that just described and be moved by the said feed apron top ends first into the said ensilage cutter mechanism and be cut by the cylinder knives 137 against the ledger plate 138, top ends first, if this arrangement should be preferred for harvesting certain varieties of stalks.

Cylinder shaft 71 carries also a sprocket wheel $f^2$ over which runs a sprocket chain $f^3$ the outer loop of which runs over a sprocket wheel $f^4$ which is secured to shaft 83 in place of the beveled gear 127 of the elevator mechanism 125 already described and illustrated in Fig. 1 and Fig. 2. Of course the hopper, receiving from the cylinder knives 137 and delivering to the buckets 133, must be remodeled a little in this machine so as to deliver directly instead of from one side thereof. It is also evident that this type of ensilage harvester attachment is well adapted to do stationary work at the silo by simply removing the fingers $e^9$, lowering the hopper $f^1$ and adjusting the elevator 125 as already specified. Feed apron 87 and attached top feed rollers are not shown in Fig. 12.

The type of ensilage harvester attachment just described, may be applied to most any well known type of tractor substantially in the manner herein specified so it will be understood that this modification of the invention will not be limited to the four wheel type of tractor as illustrated in Fig. 12.

It will also be understood that the two row ensilage harvester attachment illustrated in Figs. 8, 9, 10, 11 and 22 may be used either as a one row or two row machine and that by providing the sickle with a suitable coupling $g^1$ the sickle bar with a suitable coupling $g^2$, and the shaft $b^8$ with a suitable coupling $g^3$, the right hand gathering frame 99 with attached mechanisms may be removed from the machine entirely, that the left hand gathering frame 99 with its attached mechanisms may also be removed if desirable when the machine is used for stationary work, and that the blower pipe $t$ may be replaced by a vertical pipe so as to enable the machine to blow the ensilage directly into the silo when used to do stationary work.

The combined ensilage harvester-corn husker attachment illustrated in Figs. 13 14 and 29, will next be described. This form of implement is more particularly adapted for application to a tractor having two drive wheels in front and a single steering wheel in the rear,—the steering wheel being omitted from the illustrations. Gathering frames 99 are in this case preferably rigidly attached to a casting $g^4$ which is provided with sleeves $g^5$ extending outwardly therefrom and at right angles thereto and which are suitably journaled in the front portion of the tractor frame 1. The ensilage cutter cylinder shaft 71 is suitably journaled in the sleeves $g^5$ and carries, at one end, a sprocket wheel 70 which carries the sprocket chain 69 which runs in its rearward loop over the sprocket wheel 68 of the tractor clutch mechanism. Said clutch mechanism is operated by any suitable engine $g^7$ thereby supplying the power for operating the ensilage cutter and husking mechanism which will presently be described. As shown in Fig. 31, shaft 71 carries a spur gear $g^8$ which meshes with a spur gear $g^9$ secured to a crank shaft $h^1$ which is suitably journaled in casting $g^4$ and is provided with a plurality of cranks. $h^2$ indicates a plurality of shaker members which are suitably attached at their rear ends to said cranks, and at their front ends are pivotally attached to a plurality of support members $h^3$ pivotally supported, at their lower ends, on a shaft $h^4$ which is suitably mounted in the frame 99 as shown in Fig. 13. Shaft $h^1$ is provided with a sprocket wheel $h^5$ which runs a sprocket chain $h^6$ the upward loop of which runs over the feed roller sprocket wheels $h^7$ and $h^8$ which are suitably journaled, at one side of the casting $g^4$, thereby operating the already described ensilage cutter feeding mechanism as shown in Fig. 29. Sprocket chain $h^6$ also runs, in its upward loop, over the sprocket wheel $h^9$ which is secured to the shaft $i^1$ journaled in the casting $g^4$ and provided with a beveled gear $i^2$ which meshes with a beveled gear $i^3$ secured to the upper end of a shaft $i^4$ which is suitably journaled in the frame 99 and the casting $g^4$ and which carries a combined snapping and husking roller $i^5$ as shown in Figs. 29 and 31. A coöperating snapping and husking roller $i^6$ runs parallel to the said roller $i^5$ and is suitably journaled in the said frame 99 and casting $g^4$. Snapping and husking rollers $i^5$ and $i^6$ are both provided at their lower ends with spur gears $i^7$ which mesh with one another as shown in Fig. 29 causing them to rotate in coöperation so as to feed the received stalks butt ends first between the feed rollers of the ensilage cutter which receives directly therefrom and delivers to the ensilage cutter cylinder knives 137 which, in coöperation with the ledger plate 138, chops the received stalks into suitable lengths for ensilage. The machine may be provided with two pairs of snapping and husking rollers similar to the ones already described, the one pair being parallel and adjacent to the other and being operated from the common shaft $i^1$. These snapping and husking rollers are of the common variety ordinarily used in stationary corn shredders and huskers. The top boards and gathering chains and associated devices are practically the same as those described and are illustrated in Figs. 1 and 2 and indicated in Figs. 13 and 14 by characters signifying similar and corresponding parts. The same sickle mechanism as shown in Fig. 1 and Fig. 2 may also be used in this machine. The one shown however, is of the rotary disk type operated by the lower gathering chains 105 and sprocket wheels 106 which are provided, on their lower sides, with miter gears $i^9$ which mesh with miter gears $j^1$ secured to the top side of the disks $j^2$ which are suitably journaled onto the frame 99 and rotate in coöperation when set in motion by the gathering chains 105. The shafts 108 are provided with cranks to which the upper ends of the feed members $j^3$ are pivotally attached, said feed members being connected at their lower ends to the inner ends of the crank arms $j^4$ which are pivotally attached, at their outer ends, to the frame 99. The shafts 108 are provided, at their lower ends with beveled gears 109 which mesh with beveled gears 110 which are secured to the shaft $h^1$. The right hand beveled gear 110 also meshes with the beveled gear $j^5$ which is secured to the upper end of a shaft $j^6$ suitably journaled in the casting $g^4$ and carrying, on its lower end, a beveled gear $j^7$ which meshes with a beveled gear $j^8$ secured to the outer end of a counter shaft $j^9$ which is suitably journaled in casting $g^4$ and provided with a roller $j^{10}$, over which runs a conveyer belt $k^1$ which runs in its forward loop, between members $h^3$ and over an idler roller $k^2$ suitably journaled in the frame 99. As best shown in Fig. 32, the left hand end of shaft $j^9$ is provided with a sprocket wheel $k^{10}$ which carries a sprocket chain $k^3$, the rearward loop of which runs over a sprocket secured to the left hand end of a shaft $k^4$ parallel with shaft $j^9$ and suitably journaled, at its ends, in casting $g^4$ as shown in Fig. 32. The shaft $k^4$ carries a roller $k^5$ over which runs the endless conveyer belt $k^6$ which runs, in its rearward and upward loop, over an idler roller $k^7$ suitably journaled, at its ends, in elevator frame $k^8$ which is suitably attached to the tractor frame 1 so as to deliver into the box of a wagon which is hitched to the tractor, at the rear thereof. Cylinder shaft 71 is provided with a blower fan $k^9$ which is housed by a blower fan casing $m^1$ provided with the usual blower pipe $t$ arranged to deliver into a box of a wagon driven alongside of the machine. The tractor may be provided, at any suitable place, with a cable winding mechanism 121 (as illustrated in Fig. 1 and Fig. 2) to which the cable $m^2$ may be attached. The front end of the cable $m^2$ is attached to the hopper $m^3$ which is suitably attached to the gathering frame 99 so as to receive the corn stalks from the gathering chains 100 and 105 and direct them butt ends first into direct engagement with the said snapping and husking rollers $i^5$ and $i^6$.

The operation of the combined ensilage harvester and corn husker attachment will be as follows:—As the machine moves along the corn row, the corn stalks are cut from the ground by means of the coöperating disks $j^2$ and the gathering chains 100 and 105 convey the standing stalks upward and rearward with their butt ends riding on and through the U shaped chute 140 assisted by the kicker or feed members $j^3$ until they are deposited in the hopper $m^3$ whereupon they are engaged, at their butt ends, by the snapping and husking rollers $i^5$ and $i^6$ and delivered therefrom butt ends first to the feed rollers of the ensilage cutter and conveyed thereby into direct engagement with the ensilage cutter knives 137 which are rapidly rotated by means of the engine and transmission mechanism as already described, shearing in coöperation with the ledger plate 138 so as to reduce the received corn stalks into suitable lengths for ensilage, generating thereby enough centrifugal force and blast of air to carry and deliver the ensilage to the blower fan $k^9$ which delivers, by centrifugal force and blast of air, the ensilage from the machine through the blower pipe $t$ into the box of a wagon driven alongside of the machine. As the corn stalks are thus passed through the said rollers $i^5$ and $i^6$, the corn ears are separated from the stalks, being larger than the corn stalks and unable to pass between the said rollers $i^5$ and $i^6$. As the snapping and husking rollers $i^5$ are inclined downwardly at their front ends, the corn ears, thus removed from the corn stalks, will gradually move forwardly and downwardly until they are dropped on to the conveyer belt $k^1$. In the meantime, the husks, on the corn ears, are being removed by the pins and gripping devices on the said snapping and husking rollers $i^5$ and $i^6$ and delivered on to the shaker members $h^2$ which are provided, at their tops, with teeth slanting upward and rearward so as to throw the received husks into the ensilage cutter as they are rapidly rotated by the crank arms of the shaft $h^1$ and at the same time separate the kernels of corn which may have been shelled by the husking rollers $i^5$ and $i^6$ and allow these kernels of corn to drop on to the conveyer belt $k^1$ which delivers both the shelled and ear corn on to the endless conveyer belt $k^6$ and delivered thereby into the box of a wagon which is attached at the rear of the tractor. To facilitate this movement of the corn, shaft $j^8$ is relatively higher than the shaft $k^4$, so that the conveyer belt $k^1$ delivers on top of the endless conveyer belt $k^6$.

If it be desired to silage the corn ears as well as the corn stalks the snapping and husking rollers $i^5$ and $i^6$ should be removed from the machine, in which event, the corn ears as well as the corn stalks will be reduced to ensilage and delivered together from the machine.

There will be no use in making the ensilage harvester mechanisms as herein described and as attachments for tractors or in adapting the tractor thereto if these mechanisms are to be used only for ensilage harvester purposes, for if they are to be used only for ensilage harvester purposes, the tractor frame 1 and ensilage harvester frame 47 might as well be incorporated in one piece and the detachable feature dispensed with entirely. The combined tractor-ensilage harvester would still have its value but the detachable feature would, in such an event, have no value. It therefore becomes self evident that the purpose of the invention is, not only to provide a highly efficient tractor-ensilage harvester, for ensilage harvester work, but a tractor-ensilage harvester which may be used for other general farm purposes in the best possible manner and thereby reducing the ultimate cost of the tractor element incorporated therein by enlarging the field of its utility, broadening the scope of its service and at the same time increasing the general efficiency of the tractor for other general farm purposes. In order to accomplish this purpose, every farm implement should be incorporated in the tractor as much as possible so as to make it easier for one man to operate not only the tractor but the implement attached thereto. These attachments should be built to suit a common tractor so that they may be easily attached thereto and operated therefrom and the tractor should be built to suit not only one of these attachments, but all of the various farm implements which may be attached thereto. We shall therefore proceed to show how the tractor element described and illustrated in Figs. 1, 2, 8, 9, 10, 15, 16, 17, 18, 19, 20 and 21 is not only adapted for ensilage harvester purposes as already noted but is equally well adapted for use with grain harvester attachments, corn cultivator attachments, plows, wagons and so forth.

We shall first describe the grain harvester mechanism as applied thereto as illustrated in Fig. 15. As shown, the grain harvester is attached at the front of the main frame 1 of the tractor by means of the frame 47 which is practically the same, in its general construction, as the two row ensilage harvester attachment frame and is indicated by like characters and attached and detached from the tractor main frame 1 in the manner as already described. Likewise the front wheel $c$ and associated mechanism for steering the front wheel $c$ from the steering wheel 10 is substantially the same as that illustrated in Figs. 8 and 9, the corresponding parts of which are indicated by like characters throughout the several views. Steering shaft $k$ may however be provided with an additional knuckle 141. The header-binder which is attached to the said frame 47 and which is partially illustrated in Fig. 15 is of a well known and approved type of grain harvester and is practically the same in construction as the well known header-binder now being universally employed for grain harvesting purposes, comprising a harvester frame 142, having a sickle mechanism 143 for cutting the standing grain off the field, a reel mechanism 144 for directing the cut grain upon an endless platform conveyer belt 145 which moves transversely with reference to the movement of the machine and delivers to the endless elevator conveyer belts 146 and 147 which deliver to the butt apron mechanism 148 and to the packing and binding mechanism 149 by which the received grain is packed and bound into sheaves and delivered to a bundle carrying mechanism 150 actuated by operating mechanism 151. The construction and mode of operation of the principal parts of such grain harvesters are so well known and generally understood that it is not deemed necessary to give a detailed and minute description thereof herein. The manner of mounting the said harvester mechanism on the said frame 47 as well as the means for operating the same from the tractor element attached thereto are the elements of improvement which should be noted. The left hand member of the said frame 47 replaces the bull wheel ordinarily used in binders and header-binders. The right hand member of the said frame 47 is adjacent and parallel to the outside of seat beam 152 which is rigidly secured to the binder frame 142. The left hand member of frame 47 is pivotally attached to the binder frame 142 at about the same place and substantially in the same manner as the said bull wheel is usually attached to the binder frame 142 with freedom for vertical adjustments by means of the crank shafts 153 which are provided, at their rear ends, with the usual spiral cam adjusting mechanism 154 ordinarily employed for similar purposes as best shown in Figs. 33 and 34. In like manner, the right hand member of the frame 47 is pivotally attached to the seat beam 152 of the frame 142 with freedom for vertical adjustments by means of the said spiral cam adjusting mechanism 154 already mentioned, which castings 155 are pivotally attached to the said binder frame 142 and to the said seat beam 152. Castings 155 are suitably mounted in castings 156 with freedom for vertical adjustments by means of the said adjusting means 153 and 154 as shown in Fig. 34. Castings 156 are rigidly secured, by bolts or otherwise, to the frame 47. Thus, by turning the crank shafts 153, the header-binder may be raised and lowered bodily from the frame 47.

The harvester mechanism just described being pivotally attached to the frame 47 may therefore be easily tilted by means of a latch piece 157 which as shown in Fig. 35, is pivotally attached at its lower end to the rear end of the seat beam 152 and is pivotally attached, at its upper end, to the crank arm 158 which is attached to a lever handle 159 provided with the usual latch piece to engage the teeth of the quadrant 160 and pivotally attached, at its lower end, to a quadrant 160 secured to the right hand member of the frame 47.

Reel mechanism 144 is adjusted in the usual way by means of the usual guide rods 161 and 162 which as shown in Fig. 35 are operated by means of the usual lever mechanisms 163a which are suitably secured to the rear end of the seat beam 152 within easy reach of the operator.

The butt apron mechanism 148 is adjusted in the usual way by means of the guide rod adjusting mechanism 164, and the packing and binding mechanism 149 is adjusted in the usual way by means of the usual lever mechanism 165 arranged so as to bring the said adjusting mechanisms within easy reach of the operator.

The drive shaft of the belt pulley mechanism 45 is provided in this case with a universal joint 166 which is suitably attached at its front end, to the rear end of a shaft 167 the front end of which is connected by a universal joint 168 to the pitman drive shaft ordinarily employed in grain harvesters to supply power for operating the running parts of the grain harvester from the tractor element which is attached at the rear thereof.

Thus by attaching the frame 47 to the tractor element in the manner specified, coupling the universal joint 166 to the drive shaft of the clutch mechanism 45, and coupling the steering shaft $k$ to the universal joint 20 of the tractor steering mechanism, the combined tractor-grain harvester is ready for harvester service, as all the adjusting mechanisms of the harvester part remain permanently attached to the harvester attachment. All the harvester mechanism is ahead of the tractor element so the operation thereof may be easily watched and governed by the operator. If by operating the steering wheel 10 the front wheel $c$ be turned far enough to the left, the left hand set screw device 169 will engage the left hand lever 170 (see Figs. 17 and 18) which is pivotally attached to the sides of the bifurcated casting 13 and is pivotally attached, at its lower end, to the front end of an ordinary differential clutch operating rod 171 which governs the left hand differential clutch of the tractor thereby stopping the left hand drive wheel of the tractor and enabling the tractor-grain harvester to turn square corners or to be swung completely around by the right hand drive wheel 2 of the tractor while the left hand drive wheel 2 remains locked to the tractor frame 1. In like manner if the front wheel c be turned far enough to the right the right hand set screw 169 will engage the right hand differential clutch lever 170 so as to apply the brake to the right hand differential clutch of the tractor and stop the right hand drive wheel 2 thereby compelling the tractor to be swung around to the right by the left hand drive wheel 2. The application of the brake to either traction wheel automatically releases the brake of the other traction wheel if it has been previously set, as the rods 171 are always moved simultaneously in opposite directions by means of the beveled gear 15 and the foot pedal castings 17.

The differential clutch of the tractor above referred to by itself is old and does not originate with us and we contemplate using any suitable differential clutch having operating rods 171 which may be connected up with the steering mechanism of the tractor substantially in the manner illustrated and described herein.

We believe that the corn cultivator attachment, when operated by the tractor, should be attached to the tractor in such a manner as to enable the operator to guide the tractor by guiding the cultivator thereby, doing away with the the necessity of paying any attention to steering the tractor and enabling the operator to pay all his attention to the steering of the cultivator. The cultivator attachment should therefore be applied at the front of the tractor when the harvester attachments are removed therefrom and it is desired to use the tractor element for cultivating purposes. This arrangement will also give the operator an unobstructed view of the corn rows.

Reach pole 172 is rigidly attached, at its front end, to the main frame 173 of a corn cultivator provided with the usual mechanism ordinarily employed for cultivating corn which, as illustrated in Fig. 16, may consist of cultivator shovel frames 174 pivotally attached, at their front ends, to the cultivator frame 173 and provided, at their rear ends, with the usual shovels 175 which may be raised and lowered by means of the usual lever mechanisms 176 provided with the usual quadrants 177 rigidly secured, on their inner sides, to the lower end of a bifurcated lever handle 178. Said lever 178 is pivotally attached, at its lower end, to a casting 179 which is suitably secured near the rear end of the reach pole 172 and is provided, at its top, with a quadrant 180 having teeth to engage the latch mechanism of the bifurcated lever handle 178, the arrangement being such as is usually employed for securing lever mechanism in any set adjustment. Thus the lever mechanisms 176 may be used to adjust the depth at which the cultivator shovels 175 are to be run, and as they may be connected to the bifurcated lever handle 178, all of the shovels of the cultivator may be lifted out of the ground at the end of the row and dropped into the ground when desired by means of the one lever handle 178 which is in easy reach of the operator. As shown, the cultivator is provided with four cultivator gangs so as to cultivate two rows at a time. The rear ends of said shovel gangs may be swung to the right or to the left by sliding castings 181 on the beam 182 of the cultivator frame 173 by mechanisms ordinarily employed for that purpose. The rear end of the reach pole 172 is provided with a groove 33 and is inserted into the socket 183 of the casting 29 and locked thereto by inserting the bolts 34 of the universal hitch already described and illustrated in Figs. 19, 20 and 21.

The universal joint 20 of the tractor steering mechanism is suitably connected to a steering shaft 184 with freedom to slide forth and back. The front end of steering shaft 184 is provided with a worm 185 which meshes with a worm gear 186 suitably secured to one of the castings 187 and housed in a casting 188 which also houses the worm 185 and is rigidly secured to the beam 182 of the cultivator frame 173. The castings 187 are a part of the cultivator steering knuckles ordinarily employed for steering the cultivator wheels 189. The front ends of the castings 187 are pivotally attached to a connecting bar 190 which holds the cultivator wheels 189 parallel with each other, and is provided, at its center, with a bracket 191 suitably secured to the castings 181 by means of the coupling 192. Thus by turning the steering wheel 10 or by stepping on the foot pedal castings 17, the cultivator wheels 189 may be turned in either direction and the rear ends of the cultivator shovel gangs 174 may be swung to the right or to the left so as to properly follow the corn rows as the machine moves forward.

To loosen the soil which may have been too much packed by the drive wheels 2 of the tractor, spring teeth 193 may be applied to the soil immediately back of the drive wheels 2. In such event the upper ends of the said spring teeth 193 are suitably attached to a shaft 194 which is suitably journaled in the tractor frame 1 and is provided with a crank arm 195 pivotally attached, at its lower end, to the rear end of a rod 196 which is suitably bent upward at its front end, and pivotally attached, at its upper end to the central portion of the lever handle 178, so that when the cultivator shovels 175 are raised by pulling back said lever handle the spring teeth 193 may be thrown rearward and upward simultaneously, and by pushing the said lever handle 178 forward, the spring teeth 193 and the cultivator shovels 175 may be applied to the soil simultaneously. Of course the rod 196 may be suitably attached to the tractor frame 1 so that the spring teeth 193 may be used to loosen up the soil back of the tractor wheels 2 when the tractor element is used for other farm purposes and when the cultivator attachment at the front thereof is not used in connection therewith.

When the tractor element is used in connection with the cultivator attachment just described, the spur gear 21 may if desired be removed and the universal hitch locked to the tractor frame 1 and keyed thereto by means of the pin 197 although these changes are not absolutely essential to the successful operation of the tractor-cultivator.

If the ordinary farm implements are to be pulled by the tractor just described, they may be provided with reach members 198 which are inserted in the sockets 183 of the universal hitch casting 29 and being provided with grooves 33 (see Figs. 19, 20 and 21) they may be locked to said hitch by inserting the bolts 34. If such implement be of such a nature as to require adjustment from time to time, its reach member 198 should be provided with a sufficient number of lever mechanisms 199 properly adapted for the regulating of such a machine by the right length of rods 200 so that the attached implement may be easily operated from the driver's seat, which in such event, is attached to the tractor frame 1 in the position illustrated in dotted lines in Fig. 20. If such implement be a plow the rear end of the said reach member 198 is suitably attached to the main frame thereof while the front end of the plow beam 201 is suitably attached to the universal hitch member 30 of the universal hitch casting 29, in order to prevent the tractor from applying too much weight to the wheels of the plow while pulling it forward.

Having thus described our invention, what we claim as new and desire to secure by Letters Patent is:

1. A machine of the character described, comprising a self-propelled member, an agricultural implement disposed in advance of said member and pushed thereby, means detachably connecting said implement with said member, wheels supporting said implement, said connecting means being located below the tops of said supporting wheels, and means mounted on said self-propelled member for steering said wheels.

2. A machine of the character described, comprising a frame, traction wheels supporting said frame, a motor mounted on said frame, connections for driving said traction wheels from said motor, a harvester disposed in advance of said frame and detachably connected therewith, wheels supporting said harvester, means for operating said harvester from said motor, and means carried by said frame for steering said supporting wheels.

3. A machine of the class described, comprising a self-propelled vehicle, an agricultural implement disposed in advance of said vehicle and pushed thereby, dirigible means supporting said implement, and means carried by said implement and actuated by engagement with standing stalks for steering said dirigible means.

4. A machine of the class described, comprising a self-propelled vehicle, an agricultural implement disposed in advance of said vehicle and pushed thereby, dirigible means supporting said implement, means carried by said implement and actuated by engagement with standing stalks for steering said dirigible means, and means carried by said vehicle for steering said dirigible means.

5. A machine of the class described, comprising a frame, traction wheels supporting said frame, a motor mounted on said frame and operatively connected with said traction wheels, a corn harvester disposed in advance of said frame, laterally spaced gathering frames disposed in advance of said frame and connected therewith, a conveyer back of and in alinement with the space between said gathering frames and adapted to receive stalks delivered thereto by said gathering frames, and a stalk cutter arranged to receive stalks from said conveyer.

6. A machine of the class described, comprising a frame, traction wheels supporting said frame, a motor mounted on said frame and operatively connected with said traction wheels, a corn harvester disposed in advance of said frame, laterally spaced gathering frames disposed in advance of said frame and connected therewith, a conveyer back of and in alinement with the space between said gathering frames and adapted to receive stalks delivered thereto by said gathering frames, a stalk cutter arranged to receive stalks from said conveyer, and a deflector coöperating with said gathering frames to deliver the stalks to said conveyer butt ends first.

7. A machine of the class described, comprising a frame, traction wheels supporting said frame, a motor operatively connected with said traction wheels, a corn harvester located in advance of said frame and connected therewith, said corn harvester having laterally spaced gathering frames, wheels supporting said corn harvester, means mounted on said frame for steering said supporting wheels, and means for operating the harvester mechanism from said motor.

8. A machine of the class described, comprising a frame, traction wheels supporting said frame, a motor operatively connected with said traction wheels, a corn harvester located in advance of said frame and connected therewith, said corn harvester having laterally spaced gathering frames, wheels supporting said corn harvester, means mounted on said frame for steering said supporting wheels, means for operating the harvester mechanism from said motor, and means for vertically adjusting said harvester to regulate the height of the cut.

9. A machine of the class described, comprising a frame, traction wheels supporting said frame, a motor operatively connected with said traction wheels, a corn harvester located in advance of said frame and connected therewith, said corn harvester having laterally spaced gathering frames, wheels supporting said corn harvester, means mounted on said frame for steering said supporting wheels, means for operating the harvester mechanism from said motor, and means carried by said harvester and actuated by standing stalks for steering said supporting wheels.

10. A machine of the class described, comprising a frame, traction wheels supporting said frame, a motor mounted on said frame and operatively connected with said traction wheels, a harvester arranged in advance of and connected with said frame, said harvester having pivotally mounted gathering frames spaced apart, wheels supporting said harvester, and means for steering said supporting wheels.

11. A machine of the class described, comprising a frame, traction wheels supporting said frame, a motor mounted on said frame and operatively connected with said traction wheels, a harvester arranged in advance of and connected with said frame, said harvester having laterally spaced gathering frames, a conveyer coöperating with said gathering frames, means for driving said conveyer from said motor, gathering chains carried by said gathering frames, and means for driving said gathering chains.

12. A machine of the class described, comprising a frame, traction wheels supporting said frame, a motor mounted on said frame and operatively connected with said traction wheels, a harvester arranged in advance of and connected with said frame, said harvester having laterally spaced gathering frames, a conveyer coöperating with said gathering frames, means for driving said conveyer from said motor, gathering chains carried by said gathering frames, means for driving said gathering chains, and means detachably connecting said harvester with said frame.

13. A machine of the class described, comprising a frame, traction wheels supporting said frame, a motor mounted on said frame and operatively connected with said traction wheels, a front frame detachably connected with said frame, a harvester connected with said front frame, and means carried by said machine for lifting said front frame into operative relation to said first mentioned frame.

14. A machine of the class described, comprising a frame, traction wheels supporting said frame, a motor mounted on said frame and operatively connected with said traction wheels, a front frame connected with said first mentioned frame, wheels supporting said front frame, means for steering said supporting wheels, and gathering frames supported by said front frame and extending forward therefrom in advance of said supporting wheels.

15. A machine of the class described, comprising a frame, traction wheels supporting said frame, a motor mounted on said frame and operatively connected with said traction wheels, a front frame connected with said first mentioned frame, wheels supporting said front frame, means for steering said supporting wheels, gathering frames supported by said front frame and extending forward therefrom in advance of said supporting wheels, gathering chains carried by said gathering frames, and means for operating said gathering chains from said motor.

16. A machine of the class described, comprising a frame, traction wheels supporting said frame, a motor mounted on said frame and operatively connected with said traction wheels, a front frame connected with said first mentioned frame, wheels supporting said front frame, means for steering said supporting wheels, gathering frames supported by said front frame and extending forward therefrom in advance of said supporting wheels, and means for vertically adjusting the forward portions of said gathering frames.

In testimony whereof we hereunto affix our signatures in the presence of two witnesses.

ANDREAN G. RONNING.
ADOLPH RONNING.

Witnesses:
O. T. MELBASTAD,
O. J. FLAA.